US010609529B2

(12) United States Patent
Gholmieh et al.

(10) Patent No.: US 10,609,529 B2
(45) Date of Patent: *Mar. 31, 2020

(54) MULTI-MODEM SCHEDULER FOR MULTIMEDIA STREAMS

(71) Applicant: QUALCOMM Incorporated, San Diego, CA (US)

(72) Inventors: Ralph Akram Gholmieh, San Diego, CA (US); Sivaramakrishna Veerepalli, San Diego, CA (US); Min Wang, San Diego, CA (US); Susheel Kumar Yadav Yadagiri, San Diego, CA (US); Varun TutpetKeshavaMurthy, San Diego, CA (US); Sanjay Vishin, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,042

(22) Filed: Nov. 11, 2017

(65) Prior Publication Data

US 2018/0139585 A1 May 17, 2018

Related U.S. Application Data

(60) Provisional application No. 62/421,863, filed on Nov. 14, 2016.

(51) Int. Cl.
*H04L 12/819* (2013.01)
*H04W 4/48* (2018.01)
(Continued)

(52) U.S. Cl.
CPC ........... *H04W 4/48* (2018.02); *H04L 65/1069* (2013.01); *H04L 65/608* (2013.01); *H04L 65/80* (2013.01);
(Continued)

(58) Field of Classification Search
CPC . H04L 47/21; H04L 47/00; H04L 2012/5637; H04W 28/02; H04W 28/22; G08C 2201/42; B60W 2550/40
See application file for complete search history.

(56) References Cited

U.S. PATENT DOCUMENTS 6,028,537 A   2/2000  Suman et al.
6,564,127 B1  5/2003  Bauerle et al.
(Continued)

FOREIGN PATENT DOCUMENTS

EP          2899929 A1      7/2015

OTHER PUBLICATIONS

Halepoto I.A., et al., "Concurrent Multipath Transfer Under Delay-Based Dissimilarity Using SCTP", Second International Conference on Computing Technology and Information Management (ICCTIM), Apr. 21, 2015 (Apr. 21, 2015), XP033209647, pp. 180-185, DOI: 10.1109/ICCTIM.2015.7224614, [retrieved on Aug. 25, 2015].

(Continued)

Primary Examiner — Thai Nguyen
(74) Attorney, Agent, or Firm — The Marbury Law Group, PLLC

(57) ABSTRACT

Systems, methods, and devices of the various embodiments provide a multipath communication scheduler for an in-vehicle computing device, such as a vehicle's autonomous driving system, vehicle's telematics unit, vehicle's control system, etc. In various embodiments, a centralized scheduler for an in-vehicle computing device may assign packets for transport to a plurality of modems based at least in part on delivery delays associated with the plurality of modems. In various embodiments, delivery delays may be determined based on one or more of queue sizes of the plurality of modems, delivery rate estimates of the plurality of modems, and end to end delay estimates.

32 Claims, 16 Drawing Sheets

(51) Int. Cl.
  *H04L 29/06* (2006.01)
  *H04L 12/707* (2013.01)
  *H04L 12/26* (2006.01)
  *H04W 4/44* (2018.01)
  *H04W 40/04* (2009.01)

(52) U.S. Cl.
  CPC ......... *H04L 69/14* (2013.01); *B60W 2550/40* (2013.01); *G05B 2219/39212* (2013.01); *H04L 43/0852* (2013.01); *H04L 45/24* (2013.01); *H04W 4/44* (2018.02); *H04W 40/04* (2013.01)

(56) References Cited

U.S. PATENT DOCUMENTS

| | | | |
|---|---|---|---|
| 7,020,484 B2 | 3/2006 | Gholmieh et al. | |
| 7,668,633 B2 | 2/2010 | Diebold et al. | |
| 9,225,844 B2 | 12/2015 | Madhavan et al. | |
| 2005/0065716 A1* | 3/2005 | Timko | G01S 19/16 701/29.3 |
| 2006/0114912 A1 | 6/2006 | Kwan et al. | |
| 2012/0260296 A1* | 10/2012 | Mallet | H04W 76/15 725/62 |
| 2013/0051220 A1* | 2/2013 | Ryshakov | H04L 12/4625 370/221 |
| 2015/0207715 A1* | 7/2015 | Ozawa | H04L 45/24 370/253 |
| 2015/0381455 A1 | 12/2015 | Martinsen et al. | |
| 2018/0139140 A1 | 5/2018 | Gholmieh et al. | |

OTHER PUBLICATIONS

International Search Report and Written Opinion—PCT/US2017/061270—ISA/EPO—dated Jan. 25, 2018.
Kuhn N., et al., "DAPS: Intelligent Delay-Aware Packet Scheduling for Multipath Transport", IEEE International Conference on Communications (ICC), Jun. 10, 2014 (Jun. 10, 2014), XP032632726, pp. 1222-1227, DOI: 10.1109/ICC.2014.6883488, [retrieved on Aug. 26, 2014].

* cited by examiner

MULTI-MODEM SCHEDULER FOR MULTIMEDIA STREAMS

RELATED APPLICATIONS

This application claims the benefit of priority to U.S. Provisional Patent Application 62/421,863 entitled "Centralized Queue Size Based Multi-Modem Scheduler For Multimedia Streams," filed Nov. 14, 2016, the entire contents of which are hereby incorporated by reference for all purposes.

BACKGROUND

Vehicles, such as driverless cars, can include systems, such as sensors, cameras, etc., that can generate data that can be sent to other devices remote from the vehicle, such as remote computing device, other vehicles, etc. Additionally, vehicles, such as driverless cars, can receive data from other devices remote from the vehicle, such as remote computing device, other vehicles, etc. Such generated and/or received data can be used by the vehicle and/or the other devices remote from the vehicle to support operation of the vehicle.

As one example, vehicles, such as driverless cars, can operate autonomously in many situations. Sensors, cameras, and other systems of the vehicle can provide inputs to the vehicle's control system and the control system can operate the vehicle autonomously based on the provided inputs. However, in some scenarios the vehicle might not be able to effectively operate autonomously, and remote teleoperation of the vehicle, even for just a short period of time, may be beneficial in those scenarios. By providing the inputs received by the vehicle's control system to the remote teleoperator, the remote teleoperator can manually operate or guide the vehicle through the scenario.

SUMMARY

The systems, methods, and devices of the various embodiments provide a multipath communication scheduler for an in-vehicle computing device, such as a vehicle's autonomous driving system, vehicle's telematics unit, vehicle's control system, etc. In various embodiments, a centralized scheduler for an in-vehicle computing device may assign packets for transport to a plurality of modems based at least in part on delivery delays associated with the plurality of modems. In various embodiments, delivery delays may be determined based on one or more of queue sizes of the plurality of modems, delivery rate estimates of the plurality of modems, and end to end delay estimates. In various embodiments, a centralized scheduler for an in-vehicle computing device may further assign packets for transport based on delivery delays and path priorities associated with the plurality of modems. In various embodiments, a centralized scheduler for an in-vehicle computing device may adjust media generation rates based on available bandwidth. In various embodiments, a centralized scheduler for an in-vehicle computing device may adjust delivery rate estimates of one or more of the plurality of modems based on error detections.

Various embodiments include methods that may be implemented in a scheduler running on a processor of an in-vehicle computing device for multipath transmission from a vehicle. Various embodiments may include receiving a packet for transport in the scheduler, determining, in the scheduler, delivery delays associated with a plurality of modems, and assigning, by the scheduler, the packet to two or more of the plurality of modems based at least in part on the determined delivery delays. In various embodiments, the scheduler may assign the packet to two or more of the plurality of modems in response to a determination that a scenario for multipath transmission is occurring. In some embodiments, delivery delays may be determined based at least in part on a delivery rate estimate and queue size reporting from each of the plurality of modems. In some embodiments, the delivery rate estimate and queue size reporting from each of the plurality of modems may be periodic. In some embodiments, delivery delays may be further determined based on end to end delay estimates for each end-to-end delivery path originating at each modem. In some embodiments, assigning, by the scheduler, the packet to the two or more of the plurality of modems based at least in part on the determined delivery delays may include assigning, by the scheduler, the packet to the two or more of the plurality of modems based at least in part on the determined delivery delays and a path priority. Some embodiments may further include adjusting, by the scheduler, delivery rate estimates of one or more of the plurality of modems based on an end-to-end error detection mechanism. Some embodiments may further include determining, in the scheduler, an adjusted media generation rate based at least in part on an available bandwidth, and controlling, by the scheduler, one or more encoders providing packets to the scheduler for transport according to the adjusted media generation rate. In some embodiments, the plurality of modems may be three or more modems. In some embodiments, the scenario for multipath transmission may be an ongoing scenario during operation of the vehicle. In some embodiments, the packet for transport may support remote teleoperation of the vehicle, and the scenario for multipath transmission may be a scenario for remote teleoperation of the vehicle. Some embodiments may further include transmitting the packet from the assigned two or more of the plurality of modems to a remote teleoperator computing device. In some embodiments, the transmission may be a Multipath Real-Time Transport Protocol (MPRTP) transmission.

Further embodiments may include an in-vehicle computing device having a processor configured with processor executable instructions to perform operations of any of the methods summarized above. Further embodiments may include in-vehicle computing device having means for performing functions of any of the methods summarized above. Further embodiments may include non-transitory processor-readable media on which are stored processor-executable instructions configured to cause a processor of an in-vehicle computing device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
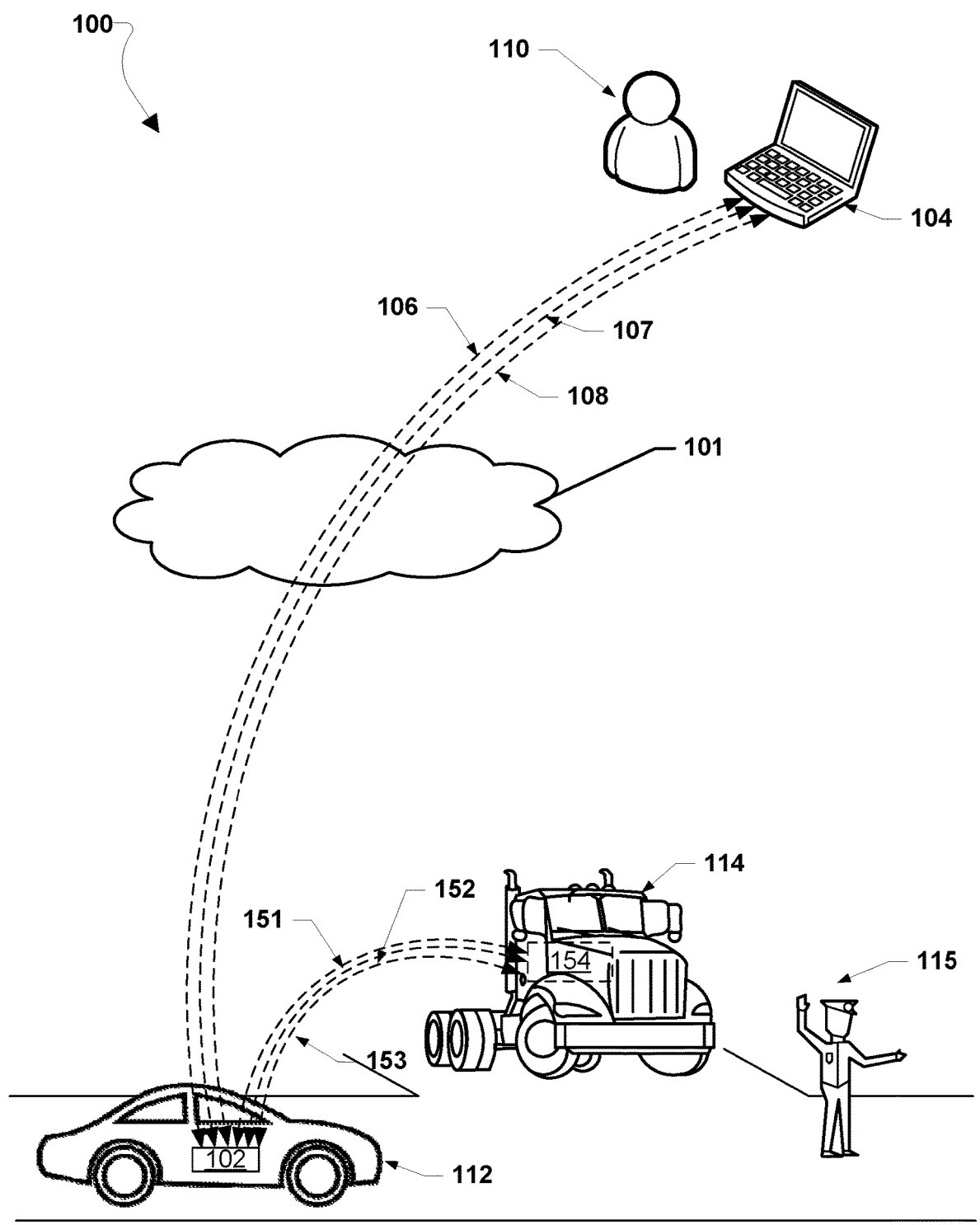
FIG. 1A is a system block diagram illustrating a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU® or CHROMECAST® or FIRE TV™), smart televisions, digital video recorders (DVRs), and similar personal electronic devices which include a programmable processor and memory and circuitry for sending and/or receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

Vehicles, such as driverless cars, may include one or more systems, such as sensors, cameras, etc., that can generate data and/or can include one or more systems that can benefit from data received from devices remote from the vehicles, such as mapping systems, remote teleoperation systems, etc. The transport of the data generated by the vehicle and/or the data received by the vehicle over any given delivery path, such as a Long Term Evolution (LTE) pathway, Wi-Fi pathway, etc., may be limited by the capabilities (e.g., bandwidth, latency, reliability, cost, etc.) of that given delivery path. Thus, while transport of data to and from vehicles like driverless cars can be beneficial, current single path communication systems may not have the capabilities (e.g., bandwidth, latency, cost, etc.) in a single path to meet the needs for data transport of such vehicles under some circumstances.

One example of a scenario in which data transport is needed for autonomous and semi-autonomous vehicles, such as driverless cars, is remote teleoperation. Remote teleoperation of driverless cars, self-driving cars, or any other type of autonomous or semi-autonomous vehicle requires both the inputs received by the vehicle's control system to be provided to a computing device of the remote teleoperator and the commands from the remote teleoperator's computing device to be provided to the vehicle's control system in essentially real time (or near real time). Reliable and real time/near real time communications of data is required to enable a remote teleoperator successfully and safely navigate the vehicle through time-critical situations, such as a traffic control scenario, an accident situation, a vehicle malfunction condition, or any other type scenario or condition necessitating remote teleoperation of the vehicle. While limited remote teleoperation of vehicles can be beneficial, current communication systems may not meet the latency requirements or the reliability requirements to support safe teleoperation of a vehicle, particularly when several vehicles may be in the same situation (e.g., in a traffic accident situation).

Another example of a scenario in which reliable, near real time data transport is needed for vehicles, such as driverless cars, is car-to-car mapping. In car-to-car mapping, a vehicle may generate a local map (or picture) of vehicles and objects around the vehicle. For example, using LIDAR or RADAR, a computing device within the vehicle may generate a map of the space around the vehicle. The computing device within the vehicle may then share that map with other vehicles, such as other driverless cars, enabling such other vehicles can to the map to update and/or generate their own respective maps. While such map sharing can be beneficial, current communication systems do not meet the bandwidth requirements at a reasonable cost to support car-to-car mapping.

Further examples of scenarios in which reliable, near real time data transport is needed for vehicles, such as driverless cars, include: transport of on-vehicle sensor data, e.g., tachometers, accelerometers, etc., to remote vehicle diagnostic services; transport of vehicle camera images to other vehicles to alert such other vehicles of traffic patterns; and transport of sensor data or camera images to other vehicles or traffic monitoring services to report the status of traffic control equipment (e.g., whether a traffic light is green or red, whether a traffic light is working or disabled, the posted speed limit for a road as indicated by a highway sign, etc.). Scenarios in which reliable, near real time data transport is needed for vehicles, such as driverless cars, may be intermittent scenarios, such as scenarios that may have a limited duration (e.g., remote teleoperation, etc.) and/or ongoing scenarios, such as scenarios that are always occurring (e.g., do not end) during operation of the vehicle (e.g., transport of on-vehicle sensor data, etc.). While such data transport can be beneficial, current communication systems do not meet bandwidth, latency, reliability, and/or cost requirements to make such data transport worthwhile and/or effective.

Various embodiments provide a centralized scheduler for an in-vehicle computing device, such as a vehicle's autonomous driving system, vehicle's telematics unit, vehicle's control system, etc. The various embodiments provide a centralized scheduler that may be used by an in-vehicle computing device to support data transmissions from and to the in-vehicle computing device while meeting bandwidth, latency, reliability, and/or cost requirements associated with such data transport. In various embodiments, a scheduler running on a processor of an in-vehicle computing device, may allocate packets for streams for transport to a plurality of modems, such as two, three, four, or more modems. For example, the streams for transport may be media streams received from encoders outputting Real-time Transport Protocol (RTP) packets and the transport may be multipath transport along the different pathways, such as transport according to the Multipath Real-Time Transport Protocol (MPRTP), as described in the Internet Engineering Task Force (IETF) Audio/Video Transport (AVT) Core Working Group's Internet-Draft draft-ietf-actcore-mprtp-03 available at https://tools.ietf.org/html/draft-ietf-avtcore-mprtp-03. As another example, the streams for transport may be streams of data from a LIDAR output as Transmission Control Protocol (TCP) packets and the transport may be multipath transport along the different pathways, such as transport according to Multipath TCP. As another example, the multipath transport along the different pathways may be transport according to the Stream Control Transmission Protocol (SCTP). In various embodiments, the scheduler may receive indications of per path statistics for delivery paths associated with each available modem. In various embodiments, a scheduler may receive per path statistics through the modem control (MC) (or modem notification (MN)) interface and/or through subflow path reporting. In various embodiments, modems may provide their available rates and queue sizes through the MC (or MN) interface.

In various embodiments, a centralized scheduler for an in-vehicle computing device may assign packets for transport to a plurality of modems, such as two, three, four, or more modems, based at least in part on delivery delays associated with the plurality of modems. In various embodiments, as a packet for transport is received, the scheduler may determine a delivery delay for each of the plurality of modems and may assign the packet to one of the plurality of modems based at least in part on the determined delivery delays. For example, the scheduler may assign the packet to the modem of the plurality of modems having the lowest determined delivery delay.

In various embodiments, delivery delays may be determined based on one or more of queue sizes of the plurality of modems, delivery rate estimates of the plurality of modems, and end to end delay estimates. In various embodiments, the scheduler may further assign packets for transport based on delivery delays and path priorities associated with the plurality of modems. In various embodiments, a centralized scheduler for an in-vehicle computing device may adjust delivery rate estimates of one or more of the plurality of modems based on error detections.

In various embodiments, a centralized scheduler for an in-vehicle computing device may adjust media generation rates based on available bandwidth. In various embodiments, adjusting media generation rate may include distributing bandwidth across various media streams and/or prioritizing media streams.

Various examples of different applications/clients, middleware, layers, stacks, radio technologies, and transport protocols are discussed herein, specifically, MPRTP, RTP, RTP Control Protocol (RTCP), secure RTP (SRTP), and LTE. The discussions of MPRTP, RTP, RTCP, SRTP, and LTE are provided merely as examples to better illustrate the aspects of the various embodiments, and are not intended to limit the various embodiments in any way. Other applications/clients, middleware, layers, stacks, radio technologies, and transport protocols, such as TCP, MPTCP, SCTP, etc., may be used with the various embodiments, and the other applications/clients, middleware, layers, stacks, radio technologies, and transport protocols may be substituted in the various examples without departing from the spirit or scope of the invention.

FIG. 1A is a system block diagram illustrating a network 100, such as a remote teleoperator network for a vehicle 112, suitable for use with various embodiments. The vehicle 112 may be any type of vehicle, such as an autonomous vehicle (e.g., driverless car, etc.), semi-autonomous vehicle, remotely operated vehicle, etc. The vehicle 112 may be configured to be operated remotely for a period of time by a remote teleoperator 110 using his or her remote teleoperator computing device 104.

To support remote teleoperation, an in-vehicle computing device 102 in the vehicle 112, such as an autonomous driving system, a telematics unit, a control system, etc. of the vehicle 112, may establish one or more different delivery communication paths 106, 107, and/or 108 through a delivery cloud (e.g., delivery paths established via distinct LTE connections established by different LTE modems) between the in-vehicle computing device 102 and the remote teleoperator computing device 104. In some embodiments, the in-vehicle computing device 102 may be part of the autonomous driving system, telematics unit, control system, etc. of the vehicle 112. In some embodiments, the in-vehicle computing device 102 may be a separate computing device, such as a system-on-chip computing device, in communication with autonomous driving system, telematics unit, control system, etc. of the vehicle 112.

Sensors, cameras, and other systems of the vehicle 112 may provide inputs to the in-vehicle computing device 102. As examples, LIDARs, RADARs, accelerometers, tachometers, forward cameras, rear-view cameras, side cameras, etc., may provide inputs to the in-vehicle computing device 102. The inputs may be received from direct connections to the sensors, cameras, and other systems, and/or may be received via connections to other communication networks, such as the controller area network (CAN) bus, etc. of the vehicle 112, or other devices such as an Ethernet connection to another on-vehicle 112 device. The inputs may have different time sensitivities. For example, some data may update rapidly and be time sensitive, such as video data, LIDAR data, audio data, etc. As an alternative example, some data may update relatively slowly, such as data received from the vehicle's CAN bus, such as temperature sensor data, odometer data, etc.

Via the one or more different delivery paths 106, 107, and/or 108 the in-vehicle computing device 102 may send the inputs from the sensors, cameras, and other systems of the vehicle 112 to the remote teleoperator computing device 104. The remote teleoperator 110 may use the inputs from the sensors, cameras, and other systems of the vehicle 112 to manually operate or otherwise guide the vehicle 112. Such manual operation of guidance to the vehicle may be accomplished by controlling a remote teleoperator computing device 104 to transmit one or more commands to the in-vehicle computing device 102 via the one or more different delivery paths 106, 107, and/or 108.

In the example of the operation of the network 100 illustrated in FIG. 1A, an autonomous vehicle 112 approaches an unmetered intersection in which a police officer 115 is directing traffic, such as a truck 114, to merge into the lane of the vehicle 112. Based on inputs from the vehicle's 112 sensors, cameras, and other systems, the in-vehicle computing device 102 (or other computing device of the vehicle) may determine that the current operating conditions exceeds the safe operating capabilities of the vehicle's autonomous driving system, and thus requires remote teleoperation of the vehicle 112. For example, the high variability and potential randomness in the operations of the police officer 115 and the truck 114 in the merging scenario may be such that the autonomous control algorithms may not be capable of ensuring safe control the vehicle 112 in the scenario. In response to determining that a scenario for remote teleoperation is occurring, the in-vehicle computing device 102 may establish one or more different delivery paths 106, 107, and/or 108 through the delivery cloud to enable remote teleoperation of the vehicle 112 by the remote teleoperator 110 via his or her remote teleoperator computing device 104. The vehicle 112 may then be navigated through the merging situation via remote teleoperation or remote guidance. Upon successful navigation through the situation, remote teleoperation of the vehicle 112 may end and control may be passed back to the vehicle's autonomous driving system.

Additionally, the vehicle 112 may establish data connections with other devices, such as other vehicles (e.g., truck 114) to send and/or receive data from those other vehicles. The computing device 102 in the vehicle 112 may establish one or more different delivery paths 151, 152, and/or 153 directly between the in-vehicle computing device 102 and the in-truck computing device 154. The delivery paths may be established via distinct LTE connections established by different LTE modems, delivery paths established via distinct Wi-Fi connections established by different Wi-Fi modems, delivery paths establish via a combination of LTE and Wi-Fi modems, etc. In some embodiments, the in-truck computing device 154 may be part of the autonomous driving system, telematics unit, control system, etc. of the truck 114. In some embodiments, the in-truck computing device 154 may be a separate computing device, such as a system-on-chip computing device, in communication with the autonomous driving system, telematics unit, control system, etc. of the truck 114. Sensors, cameras, and other systems of the truck 114 may provide inputs to the in-truck computing device 154. As examples, LIDARs, RADARs, accelerometers, tachometers, forward cameras, rear-view cameras, side cameras, etc., may provide inputs to the in-truck computing device 154. The inputs may be received from direct connections to the sensors, cameras, and other systems, and/or may be received via connections to other communication networks, such as the truck's CAN bus, etc., or other devices, e.g., an Ethernet connection to another on truck 114 device. Via the one or more different delivery paths 151, 152, and/or 153 the in-vehicle computing device 102 and the in-truck computing device 154 may exchange their respective inputs from the sensors, cameras, and other systems. As an example of the transport of data exchanged between the truck 114 and the vehicle 112 via the one or more different delivery paths 151, 152, and/or 153, the vehicle 112 and truck 114 may exchange map data in a car-to-car mapping process. As another example, the vehicle 112 may send the truck 114 camera data of the police officer 115 to enable the truck 114 to better maneuver through the traffic scenario based on the camera data from the vehicle 112.

Figure 1B:
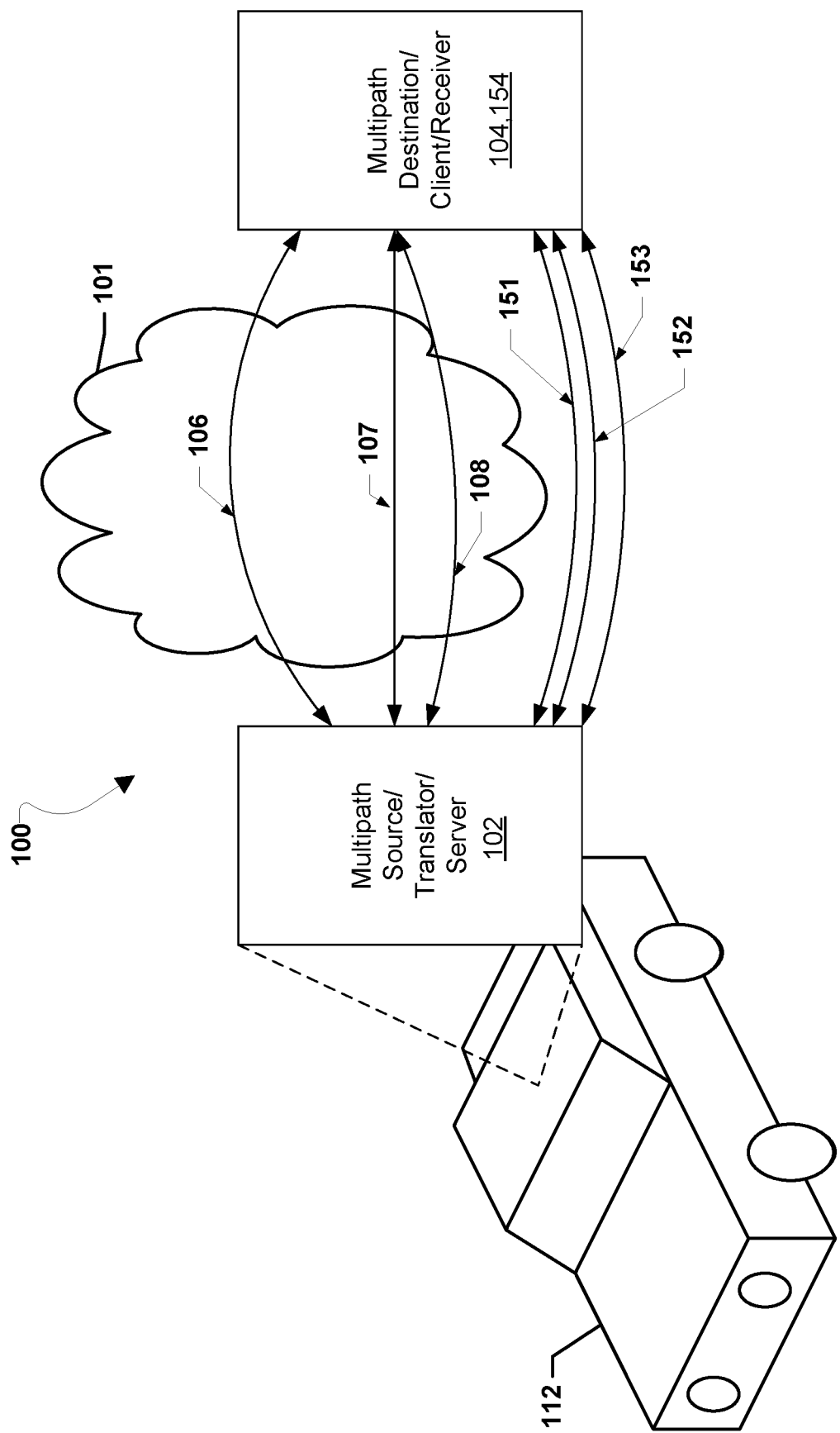
FIG. 1B is a communication system block diagram of a network suitable for use with various embodiments.

FIG. 1B illustrates further aspects of the network 100 suitable for use with various embodiments. As described with reference to FIG. 1A, the network 100 may include two computing devices 102 and 104/154 configured to communicate with one another via multipath transport sessions, such as MPRTP transport sessions. At a given time in any multipath transport session one computing device, such as in-vehicle computing device 102, may be the computing device sending multipath subflows to the other computing device which may receive one or more of the multipath subflows, such as remote teleoperator computing device 104, in-truck computing device 154, etc., via different delivery paths 106, 107, and/or 108 established via a delivery cloud 101 (e.g., the Internet, LTE networks, etc.) and/or different delivery paths 151, 152, and/or 153 established directly, between the two computing devices 102 and 104/154. The computing device sending the multipath subflows, such as in-vehicle computing device 102, may be referred to as a multipath source computing device, multipath translator, or multipath server. The computing device receiving the multipath subflows, such as a remote teleoperator computing device 104, in-truck computing device 154, etc., may be referred to as a multipath destination computing device, multipath client, or multipath receiver. The different delivery paths 106, 107, and/or 108 may each be separate delivery paths through the delivery cloud 101 (e.g., delivery paths established via distinct LTE connections established by different LTE modems) and/or different delivery paths 151, 152, and/or 153 established directly and the different delivery paths may be routed from distinct Internet Protocol (IP) addresses of the computing device sending the multipath subflows, such as in-vehicle computing device 102, to one or more IP addresses of the computing device receiving the multipath subflows, such as remote teleoperator computing device 104, in-truck computing device 154, etc.

In various embodiments, each multipath stream sent over the different delivery paths 106, 107, 108, 151, 152, and/or 153 may be the same, such that should any one delivery path experience a failure, another delivery path may still provide the same multipath stream, thereby providing redundancy and improved quality of service. For example, each multipath stream may be the same MPRTP stream sent over the different delivery paths 106, 107, 108, 151, 152, and/or 153. In various embodiments, the multipath streams may enable a receiver to recover the original media stream, such as the original RTP stream. By enabling such recovery, the various embodiments may allow a higher utilization and better reliability than current systems through the use of the multiple paths that are available. In various embodiments, delivery paths 106, 107, 108, 151, 152, and/or 153 may be assigned different priorities, such as one delivery path (e.g., 106, 107, 108, 151, 152, or 153) being prioritized over the other delivery paths (e.g., 106, 107, 108, 151, 152, or 153). Delivery paths 106, 107, 108, 151, 152, and/or 153 may be prioritized relative to one another based on one or more path attributes associated with the delivery paths 106, 107, 108, 151, 152, and/or 153, such as cost, bandwidth, quality-of-service (QoS), etc.

Figure 2:
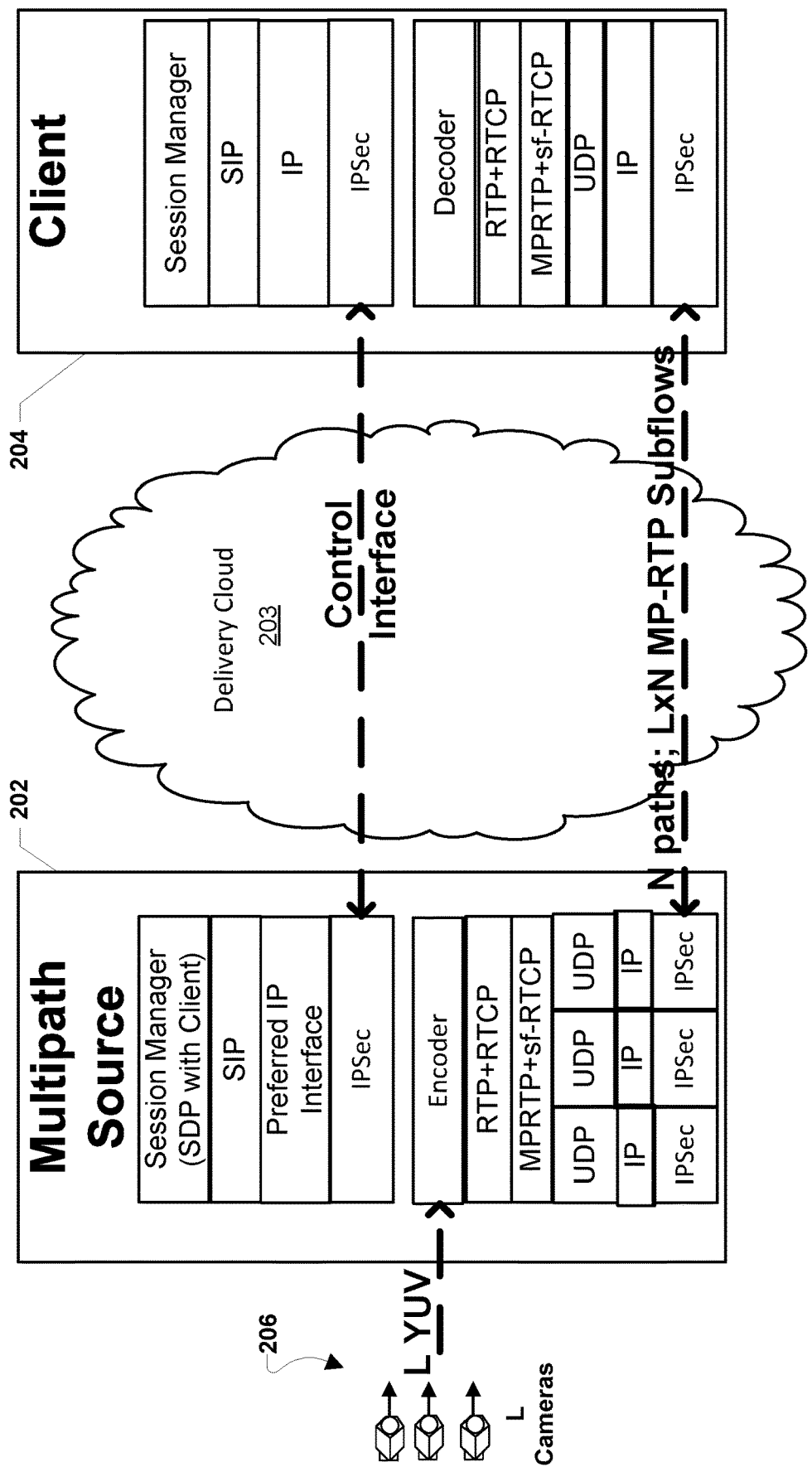
FIGS. 2 and 3 are system block diagrams illustrating relationships between network elements and the computing device layers (or stacks) in a network according to various embodiments.

FIG. 2 illustrates relationships between a multipath source 202 and multipath client 204 in a network according to various embodiments. For example, the multipath source 202 may be an in-vehicle computing device, such as in-vehicle computing device 102, and the multipath client 204 may be a remote teleoperator computing device, such as remote teleoperator computing device 104. FIG. 2 illustrates the various embodiment relationships using SIP, Session Description Protocol (SDP), RTP, RTCP, MPRTP, UDP, and IP as protocols supporting the multipath transmissions, however, these protocols are merely examples suitable for use with the various embodiments and other protocols, such as TCP, MTCP, SCTP, etc., may be substituted for SIP, SDP, RTP, RTCP, MPRTP, UDP, and IP in the various embodiments. The multipath source 202 may receive inputs from "L" number of cameras 206 (or sensors (e.g., LIDAR, RADAR, accelerometers, tachometers, etc.), other systems, etc.), such as three cameras, at an encoder (or sensor signal processing device, other system processor, etc.) that may output a stream of packets, such as video packets, including the inputs from each camera (or sensors, other systems, etc.) for transmission to the multipath client 204. The encoder (or sensor signal processing device, other system processor, etc.) may output the media stream to an RTP and RTCP stack (or layer), which may package the media packets as RTP packets for transport via RTP. The RTP and RTCP stack (or layer) may send the RTP stream to the MPRTP stack (or layer), which may prepare the RTP packets for transport via MPRTP. For example, the MPRTP stack (or layer) may add MPRTP extension headers to the RTP packets to generate MPRTP packets. In various embodiments the RTP and RTCP stack (or layer) and the MPRTP stack (or layer) may be separate layers or may be combined into a single layer.

The stream of packets may be spread over "N" number of streams (e.g., three streams), such that each stream may include inputs from the "L" cameras 206 (or sensors, other systems, etc.) in separate subflows. The "N" streams may be sent to their own respective User Datagram Protocol (UDP) stack (or layer), which may output the MPRTP subflows to respective modems for transmission via their own IP address to the IP address of the multipath client 204 over the delivery cloud 203, such as the Internet, LTE networks, etc. Each stream may be sent over its own delivery path, such that "N" different delivery paths may each provide "L" subflows to the multipath client 204's IP address in the delivery session. In various embodiments, security may be applied to the IP streams on a per stream basis by IP security layers at the modems.

The delivery session between the multipath source 202 and the multipath client 204 may be managed by a session manager with SDP client on the multipath source 202 that may generate an SDP for the MPRTP transport session providing the various streams from the multipath source 202 to the multipath client 204. In this manner, the session control may be end-to-end. The SDP may be sent from the session manager of the multipath source 202 to the session manager of the multipath client 204 using the session initiation protocol (SIP). The SDP may be sent via any pathway, such as a dedicated control channel between one or more IP addresses of the multipath source 202 and an IP address of the multipath client 204, one of the "N" different delivery paths used for the transport of the streams, or any other delivery mechanism. The SDP may indicate various information including the number of streams (e.g., number of video streams, sensor streams, etc.), a packet or stream description (e.g., a media description including video encoder configuration and RTP packet information, etc.), bandwidth, IP address and port information to receive streams (e.g., video streams, etc.) and their corresponding control packets, etc. The multipath source 202 may also indicate a preferred or prioritized IP interface via the SDP. The preference or priority may be relative among the various "N" different delivery paths, and may be based on one or more path attributes, such as cost of using delivery paths, bandwidth of delivery paths, QoS of delivery paths, etc. The multipath client 204 may receive the SDP from the multipath source 202 and receive the streams by combining the one or more of the "N" different delivery paths according to the SDP. Additionally, the SDP may indicate IP security contexts for the MPRTP transport session, such as encryption and authentication keys, for the MPRTP subflows.

The multipath client 204 may receive the MPRTP subflows sent via the "N" different delivery paths and in the opposite manner of the multipath source 202 pass the received MPRTP packets of the streams via a UDP stack (or layer) to an MPRTP stack (or layer). The MPRTP stack (or layer) may remove any MPRTP extension headers as needed to reconstitute the original RTP and RTCP packets and may pass the RTP and RTCP packets to the RTP and RTCP stack (or layer). The RTP and RTCP stack (or layer) may pass the packets to a decoder (or sensor signal processing device, other system processor, etc.) that may decode the packets to produce the original "L" camera (or sensor, other system, etc.) inputs for further use by the multipath client 204. For example, the multipath client 204 may be a backend server that may store the original "L" camera inputs for use by a remote teleoperator. As another example, the multipath client 204 may be the remote teleoperator computing device 104 and the remote teleoperator computing device 104 may output the original "L" camera (or sensor, other system, etc.) inputs to the remote teleoperator 110 to enable the remote teleoperator 110 to control the vehicle 112.

Figure 3:
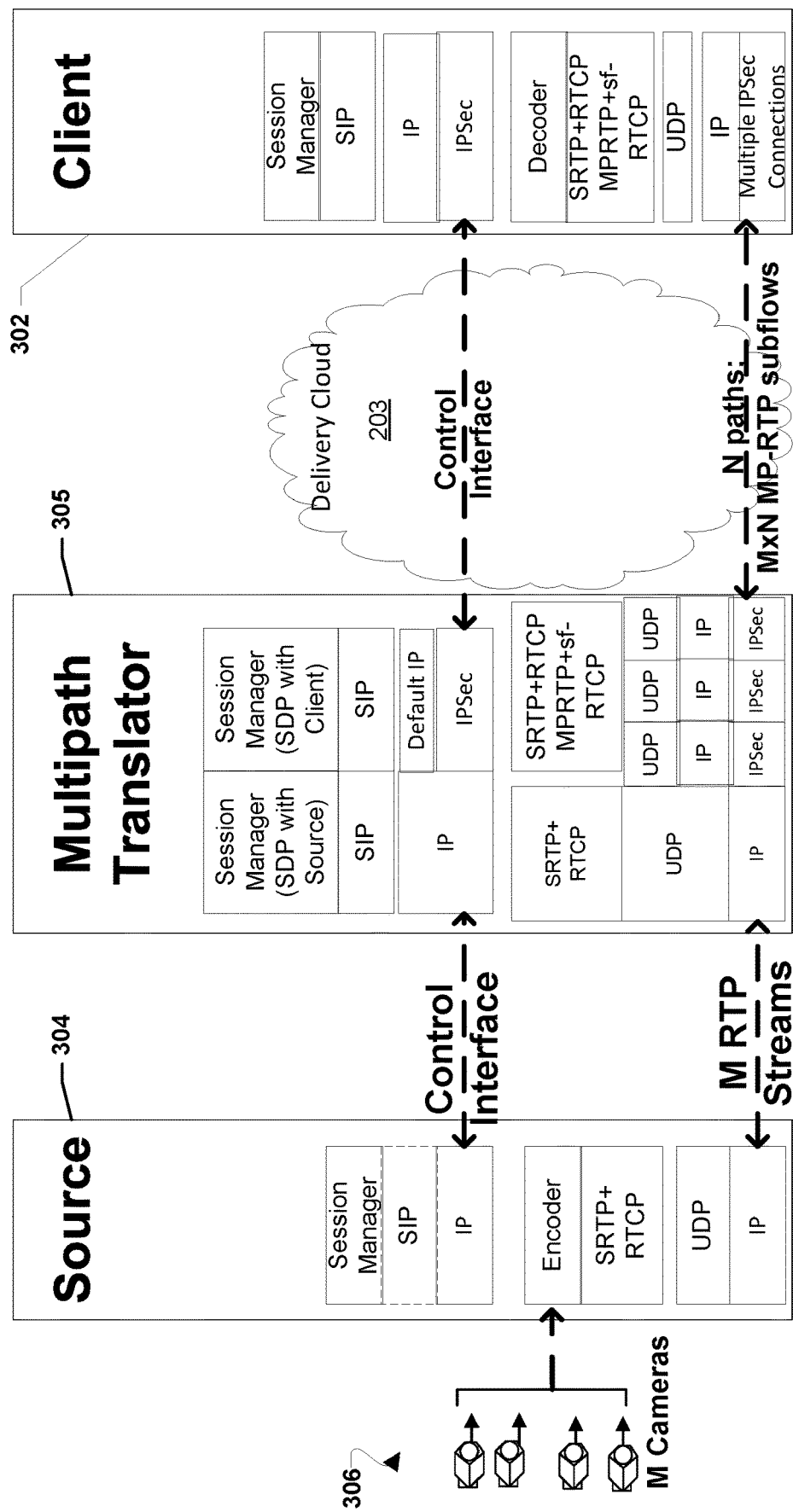

FIG. 3 illustrates relationships between a source 304, such as an RTP source, a multipath translator 305, such as an MPRTP translator, and multipath client 302, such as an MPRTP client, in a network according to various embodiments. For example, the source 304 may be an autonomous driving system, telematics unit, vehicle control system, etc. of a vehicle, such as vehicle 112, the multipath translator 305 may be an in-vehicle computing device, such as in-vehicle computing device 102, and the multipath client 302 may be a remote teleoperator computing device, such as remote teleoperator computing device 104. FIG. 3 illustrates the various embodiment relationships using SIP, SDP, RTP, RTCP, MPRTP, UDP, and IP as protocols supporting the multipath transmissions. However, these protocols are merely examples suitable for use with the various embodiments and other protocols, such as TCP, MTCP, SCTP, etc., may be substituted for SIP, SDP, RTP, RTCP, MPRTP, UDP, and IP in the various embodiments.

The source 304 may receive inputs from "M" number of cameras 306 (or sensors (e.g., LIDAR, RADAR, accelerometers, tachometers, etc.), other systems, etc.), such as four cameras, and via an encoder (or sensor signal processing device, other system processor, etc.), SRTP/RTCP stack (or layer), UDP stack (or layer), and IP stack (or layer) (e.g., via an Ethernet connection), output a number "M" of RTP streams to the multipath translator 305. The RTP transport session between the RTP source 304 and multipath translator 305 may be controlled by the session manager of the RTP source 304 which may generate and send a SDP for the session to the multipath translator 305. The SDP may indicate various information including the number of streams (e.g., video streams, sensor streams, etc.), a packet or stream descriptions (e.g., a media description including video encoder configuration and RTP packet information, etc.), bandwidth, IP address and port information to receive streams (e.g., video streams, sensor streams, etc.) and their corresponding control packets, etc. A session manager at the multipath translator 305 may receive the SDP from the RTP source 304.

The multipath translator 305 may receive the SDP from the RTP source 304 and according to the SDP receive the "M" RTP streams. The multipath translator 305 may pass the received RTP streams to an SRTP and RTCP stack (or layer) that may send the RTP stream to the SRTP and RTCP/MPRTP and sf-RTCP stack (or layer) for preparation for transport via MPRTP. For example, the SRTP and RTCP/MPRTP and sf-RTCP stack (or layer) may add MPRTP extension headers to the RTP packets to generate MPRTP packets.

The stream of packets may be delivered in "N" streams (e.g., three streams), such that each stream may inputs from the "M" cameras 306 in a separate subflow. In various embodiments, the streams may carry disjointed information, redundant information, a mix of disjointed and redundant packets or a mix of original packets and repair packets. For example, a mix of original packets and repair packets may be carried when forward error correction (FEC) is applied. The "N" streams may be sent to their own respective User Datagram Protocol (UDP) stack (or layer), which may output the MPRTP subflows to respective IP and IP Security stacks (or layers) of respective modems for transmission via their own IP address to the IP address of the multipath client 302 over the delivery cloud 203, such as the Internet, LTE networks, etc. Each stream may be sent over its own delivery path, such that "N" different delivery paths may provide the "M" subflows to the multipath client 302's IP address in the delivery session.

The delivery session between the multipath translator 305 and the multipath client 302 may be managed by the session manager on the multipath translator 305. The session manager of the multipath translator 305 may modify the SDP received from the RTP source 304 to add MPRTP extension information. In this manner, the modified SDP sent from the multipath translator 305 to the multipath client 302 may describe the MPRTP session between the multipath translator 305 and the multipath client 302. In this manner, the session control may be achieved end-to-end. The modified SDP may indicate various information including the number of streams (e.g., video streams, sensor streams, etc.), a description of the packets or streams (e.g., a media description including video encoder configuration and RTP packet information, etc.), bandwidth, IP address and port information to receive streams (e.g., video streams, sensor streams, etc.) and their corresponding control packets, etc. The SDP may be sent from the session manager of the multipath translator 305 to the session manager of the multipath client 302 using the session initiation protocol (SIP). The SDP may be sent via any pathway, such as a dedicated control channel between one or more IP addresses of the multipath translator 305 and an IP address of the multipath client 302, one of the "N" different delivery paths used for the transport of the streams, or any other delivery mechanism. The multipath client 302 may receive the modified SDP from the multipath translator 305 and receive the streams via one or more of the "N" different delivery paths according to the modified SDP. Additionally, the SDP may indicate security contexts for the MPRTP transport session, such as the IP security applied by the RTP source 304 and the SMPRTP encryption and authentication applied by multipath translator 305. The multipath translator 305 may also indicate a preferred or prioritized IP interface via the SDP. The preference or priority may be relative among the various "N" different delivery paths, and may be based on one or more path attributes, such as cost of using delivery paths, bandwidth of delivery paths, QoS of delivery paths, etc.

The multipath client 302 may receive the MPRTP subflows sent via the "N" different delivery paths and pass the received MPRTP packets of the streams via a UDP stack (or layer) to a SRTP and RTCP/MPRTP and sf-RTCP stack (or layer). The SRTP and RTCP/MPRTP and sf-RTCP stack (or layer) may remove any MPRTP extension headers as needed to reconstitute the original RTP and RTCP packets and may pass packets to a decoder (or sensor signal processing device, other system processor, etc.) that may decode the packets to produce the original "M" camera (or sensor, other system, etc.) inputs for further use by the multipath client 302. For example, the multipath client 302 may be a backend server that may store the original "M" camera inputs for use by a remote teleoperator. As another example, the multipath client 302 may be the remote teleoperator computing device 104 and the remote teleoperator computing device 104 may output the original "M" camera (or sensor, other system, etc.) inputs to the remote teleoperator 110 to enable the remote teleoperator 110 to control the vehicle 112.

Figure 4A:
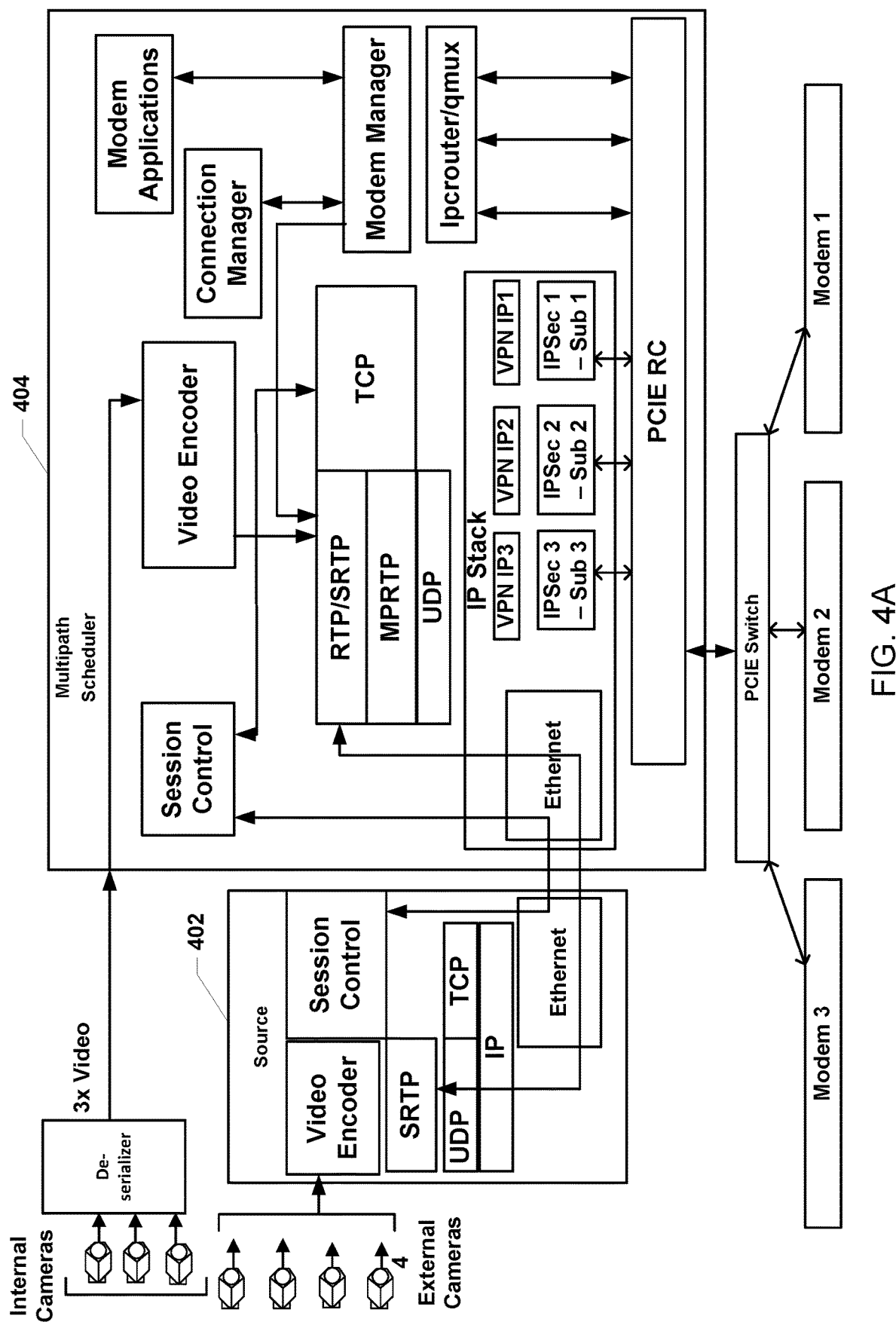
FIGS. 4A and 4B are system block diagrams illustrating relationships between network elements and the computing device layers (or stacks) in a network according to various embodiments.

FIG. 4A illustrates example relationships between a source computing device 402 and a multipath translator 404 in a network according to various embodiments. For example, the source computing device 402 may be an autonomous driving system, telematics unit, vehicle control system, etc. of a vehicle, such as vehicle 112, the multipath translator 404 may be an in-vehicle computing device, such as in-vehicle computing device 102. The source computing device 402 and multipath translator 404 may be similar to the source computing device 304 and multipath translator 305 described above with reference to FIG. 3, except that in addition to receiving RTP streams from the source computing device 402, the multipath translator 404 may also encode and generate its own RTP streams from internal cameras (or other sensors, systems, etc.) 1, 2, and 3. FIG. 4 illustrates the various embodiment relationships using SIP, SDP, RTP, RTCP, SRTP, MPRTP, UDP, TCP, Ethernet, and IP as protocols supporting the multipath transmissions, however, these protocols are merely examples suitable for use with the various embodiments and other protocols, such as TCP, MTCP, SCTP, etc., may be substituted for SIP, SDP, RTP, RTCP, SRTP, MPRTP, UDP, TCP, Ethernet, and IP in the various embodiments. The internal cameras (or sensors (e.g., LIDAR, RADAR, accelerometers, tachometers, etc.), other systems, etc.) 1, 2, and 3 may provide outputs to the video encoder (or other type encoder) of the multipath translator 404, which may output the RTP streams for the internal cameras (or other sensors, systems, etc.) to the RTP/SRTP stack (or layer).

The source computing device 402 may connect to the multipath translator 404 using a local Ethernet connection. The Ethernet connection may handle session control signaling between the source computing device 402 and the multipath translator 404. The Ethernet connection may also provide the outputs of the four external cameras (or other sensors, systems, etc.) as RTP streams to the RTP/SRTP stack (or layer) of the multipath translator 404. In various embodiments, an application on the source computing device 402 may establish and maintain a control connection to the multipath translator 404. The logical session management function on the source computing device 402 may establish a SIP connection to the multipath translator 404 to manage session establishment and teardown for the external camera streams. The multipath translator 404 may use the SDP delivered by the source computing device 402 to create the MPRTP session SDP that may be established with the backend MPRTP client (e.g., a backend server) receiving the MPRTP streams via the modems 1, 2, and 3. The logical session management function on the multipath translator 404 may establish a SIP connection to the source computing device 402 to manage session establishment and teardown using the SIP protocol. After session establishment, media streams may be delivered either using RTP or MPRTP to the multipath translator 404.

The multipath translator 404 may connect to 3 modems, 1, 2, and 3, via a Peripheral Component Interconnect Express (PCIE) switch. Each modem 1, 2, and 3 may have its own subscription with a different service provider. For example, each modem 1, 2, and 3 may be a different LTE modem establishing a different connection with a different carrier network. Costs, bandwidths, and QoS for each service provider and/or carrier network may be the same or different. Additionally, the capabilities of each modem 1, 2, and 3 may be the same or different. The modem manager may support multiple modems, and the connection manager may provide basic control to modem applications for accessing and managing the modems 1, 2, and 3. The modem manager interface may provide further functionality for accessing modem controls and information. For example, the uplink reporting of the available delivery rates on the modems (e.g., a MC (or MN) interface) may be available on the modem manager interface. A traffic scheduler of the multipath translator 404 may schedule MPRTP packets for the streams to the modems 1, 2, and 3. In various embodiments, the traffic scheduler may be part of the MPRTP stack (or layer) of the multipath translator 404. In various embodiments, the traffic scheduler may be a standalone application interfacing with other stacks (or layers) of the multipath translator 404, such as the MPRTP stack (or layer), IP stack, TCP stack (or layer), modem manager, and/or modem applications, etc.

IPSec tunnels, IPSec1, IPSec2 and IPSec3, may be established to the backend multipath client (e.g., a backend server). In this manner, multiple virtual interfaces, each using its own virtual private network (VPN) IP address VPN IP1, VPN IP2, and VPN IP3, may be established. IPSec header and trailer overhead may be taken into account when establishing the interfaces. The multipath translator 404 may establish and maintain a control connection to the backend multipath client (e.g., a backend server).

The multipath translator 404 may operate as a RTP to MPRTP translator or MPRTP to MPRTP translator to deliver the streams (e.g., video streams, sensor streams, etc.) to the multipath client using MPRTP. The streams (e.g., video streams, sensor streams, etc.) may be delivered using one or more of the three paths established by the modems 1, 2, and 3, respectively. The multipath translator 404 may prefer a path due to possibly favorable terms from the corresponding operator. In some embodiments, the multipath translator 404 may establish all single-path communication over the interface associated with the preferred operator. Any artificial favoring of one interface may increase the delay in the system. However, the packet scheduling algorithms of the various embodiments may route the traffic to the queues that hold less data. In this manner, competing TCP traffic may be given a chance to get through in various embodiments because the scheduler will divert multipath traffic to queues with less occupancy and delay. Thus, the queue serving TCP maybe avoided by the multipath scheduler due to the additional queue size caused by TCP. In various embodiments, the multipath stack (or layer) may provide rate control feedback. For example, the multipath stack (or layer) may compare an aggregate available rate to aggregate source rates. The multipath stack (or layer) may provide a suggested transmit rate per source whenever needed.

Figure 4B:
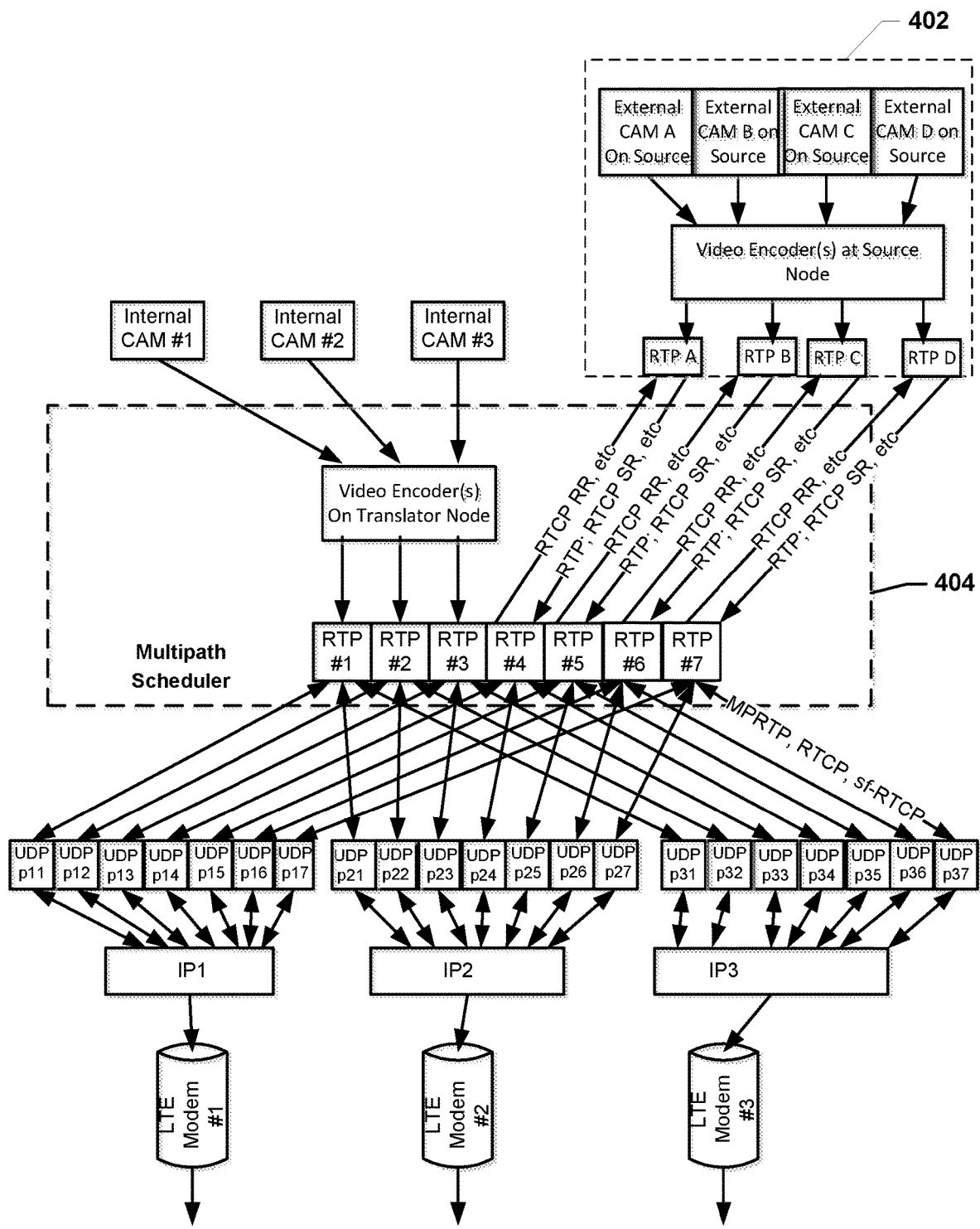

FIG. 4B illustrates relationships of RTP flows between the source computing device 402 and a multipath translator 404 according to various embodiments. The RTP streams from the source computing device 402 and the self-generated RTP streams of the multipath translator 404 may be combined and handled by the multipath translator as subflows as described above with reference to FIG. 3. In various embodiments, the multipath translator 404 may translate the incoming RTP packets into a series of subflows and may generate control packets, such as RTCP packets, on a subflow basis (i.e., sf-RTCP packets). In this manner, the RTCP subflow sender and receiver reports may be generated on a per path basis. The multipath translator 404 may relay sf-RTCP sender reports to the destination computing device, and sf-RTCP packets may not be forwarded from the multipath translator 404 to the source computing device 402. MPRTP may be used to distribute the RTP packets onto MPRTP subflows by inserting a MPRTP header extension into the RTP header. The MPRTP header extension may include a subflow identifier, and a subflow sequence number. The sf-RTCP moniker may be used to identify the RTCP subflow reports that may be defined in the MPRTP protocol. These subflow RTCP packets may provide delivery statistics on the different subflows. While described above with reference to RTP to MPRTP translation, the same operations as described in FIGS. 1A-4B may be used for MPRTP-to-MPRTP translation.

Figure 5:
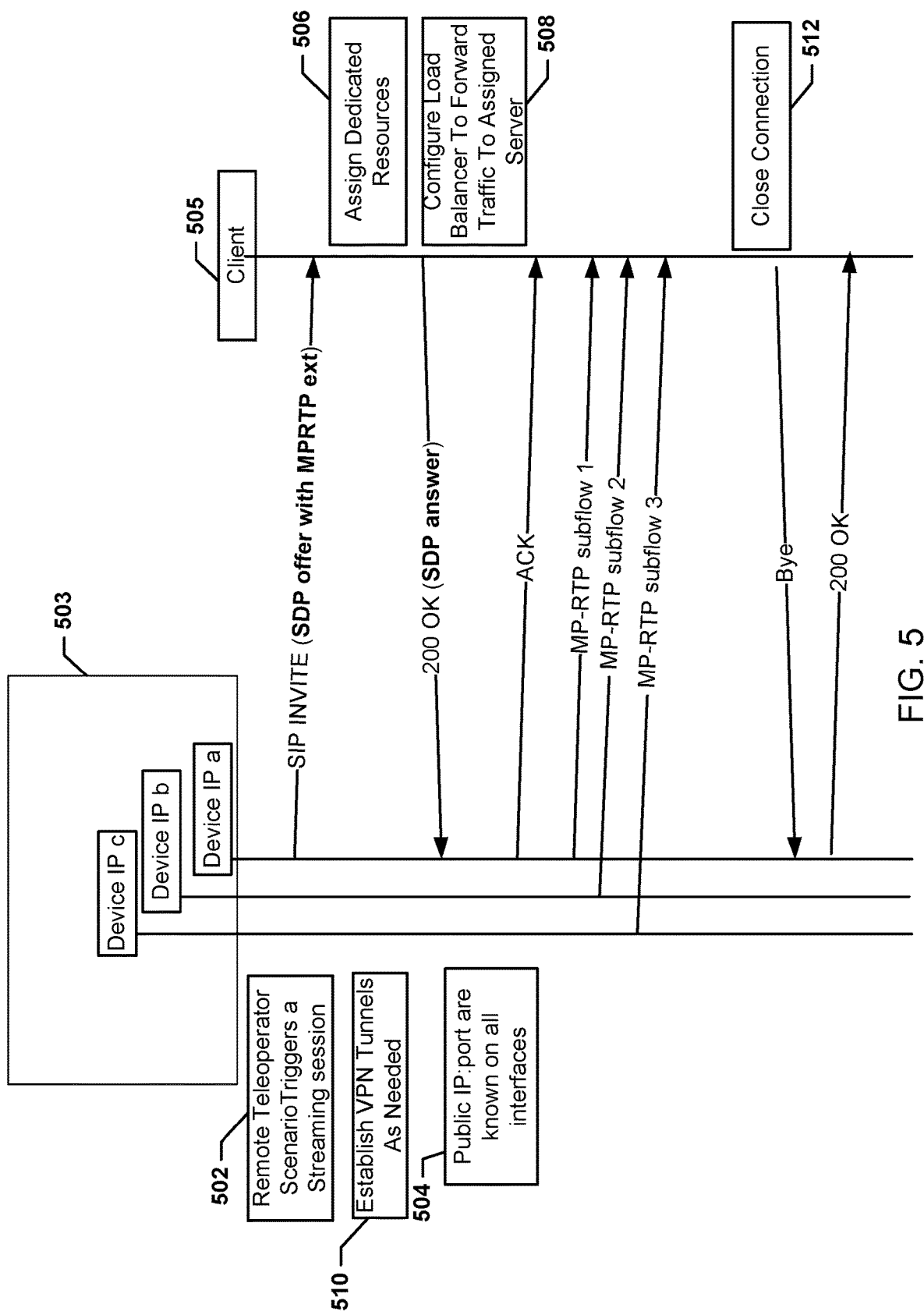
FIG. 5 is a call flow diagram illustrating interactions between a multipath translator and destination computing device to establish a multipath transport session according to an embodiment.

FIG. 5 is a call flow diagram illustrating interactions between a multipath translator 503 and destination (or client) computing device 505 to establish a multipath transport session according to an embodiment, such as an MPRTP transport session. The multipath translator 503 may be an in-vehicle computing device, such as in-vehicle computing device 102, and the destination computing device 505 may be a remote teleoperator computing device, such as remote teleoperator computing device 104. For example, the interactions illustrated in FIG. 5 may be used to establish a session for an internal camera stream.

To initiate the multipath transport session an application at the multipath translator 503 may trigger a streaming session at operation 502. For example, a remote teleoperator scenario may be determined to be occurring, and in response the streaming session may be triggered. The triggering of the streaming session may cause the multipath translator 503 to send a SIP invite with SDP offer for the session to the destination computing device 505. The destination computing device 505 may assign dedicated resources to the transport session as needed in operation 506. At operation 510 the multipath translator 503 may establish VPN tunnels for interfaces not already established, for example a second and third interface. The multipath translator 503 may send the SDP with the MPRTP extension to the destination computing device 505 and the destination computing device 505 may respond acknowledging receipt of the SDP. The destination computing device 505 may configure a load balancer to forward received traffic as needed in operation 508.

The multipath translator 503 may acknowledge the transport session to the destination computing device 505, which may begin the transport session. The multipath translator 503 may then send the MPRTP subflows to the destination computing device 505. In operation 512, the destination computing device 505 may determine to close the connection, for example because sufficient video may have been received, and may send a close message to the multipath translator 503. The multipath translator 503 (and/or peer device) may respond with a 200 OK message and close the transport sessions for the various MPRTP subflows.

Figure 6:
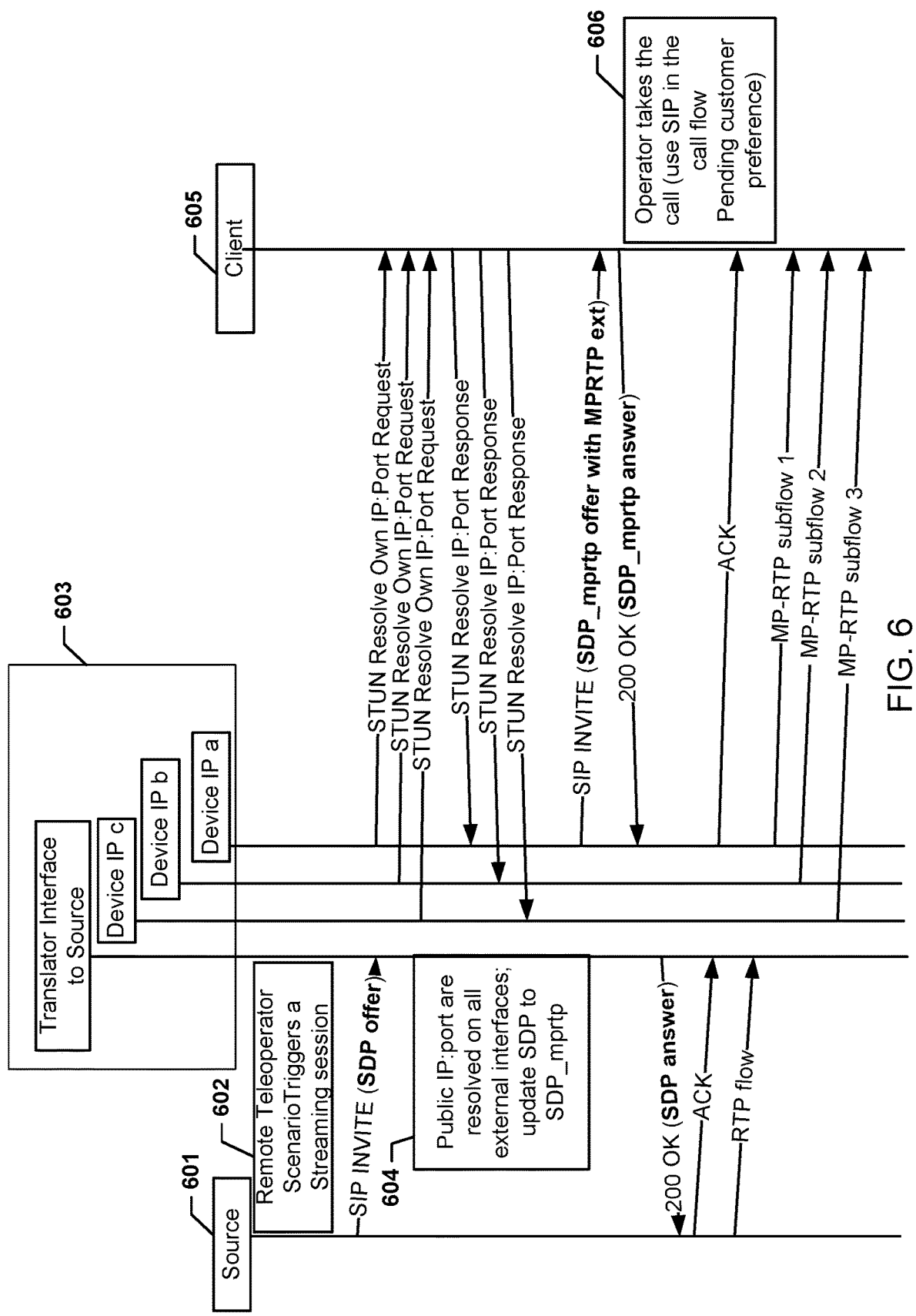
FIG. 6 is a call flow diagram illustrating interactions between a source computing device, multipath translator, and destination computing device to establish a multipath transport session according to an embodiment.

FIG. 6 is a call flow diagram illustrating interactions between a source computing device 601, multipath translator 603, and destination (or client) computing device 605 to establish a multipath transport session, such as an MPRTP transport session according to an embodiment. For example, the source computing device 601 may be an autonomous driving system, telematics unit, vehicle control system, etc. of a vehicle, such as vehicle 112, the multipath translator 603 may be an in-vehicle computing device, such as in-vehicle computing device 102, and the destination computing device 605 may be a remote teleoperator computing device, such as remote teleoperator computing device 104. For example, the interactions illustrated in FIG. 6 may be used to establish a session for an external camera stream. To initiate the multipath transport session an application at the source computing device 601 may trigger a streaming session at operation 602. For example, a remote teleoperator scenario may be determined to be occurring, and in response the streaming session may be triggered. The triggering of the streaming session may cause the source computing device 601 to send a SIP invite with SDP offer for the session to the translator interface of the multipath translator 603. In response to receiving the SIP invite, the multipath translator 603 may send IP port requests from each of its IP stacks a, b, and c to the destination computing device 605. The destination computing device 605 may send port responses to the IP stacks a, b, and c of the multipath translator 603.

Once the IP port requests are resolved (604), the multipath translator 603 may modify the SDP received from the source computing device 601 to reflect the IP address for the destination computing device 605 and any other information needed for the MPRTP transport session between the multipath translator 603 and the destination computing device 605. If the IPSec tunnels on the less preferred interfaces are not pre-established, then the multipath translator 603 may establish these VPN tunnels before modifying the SDP since the IP addresses on the VPN may be required to be able to issue the SDP. The multipath translator 603 may send the modified SDP with the MPRTP extension to the destination computing device 605 and the destination computing device 605 may respond acknowledging receipt of the SDP. The multipath translator 603 may reply to the source computing device 601 acknowledging receipt of the SDP in response to receiving acknowledgment from the destination computing device 605.

The source computing device 601 may acknowledge the transport session and begin the RTP flow to the multipath translator 603. The multipath translator 603 may acknowledge the transport session to the destination computing device 605, which may begin the transport session using a call flow mechanism according to a user preference 606. The multipath translator 603 may then send the MPRTP subflows to the destination computing device 605.

Figure 7:
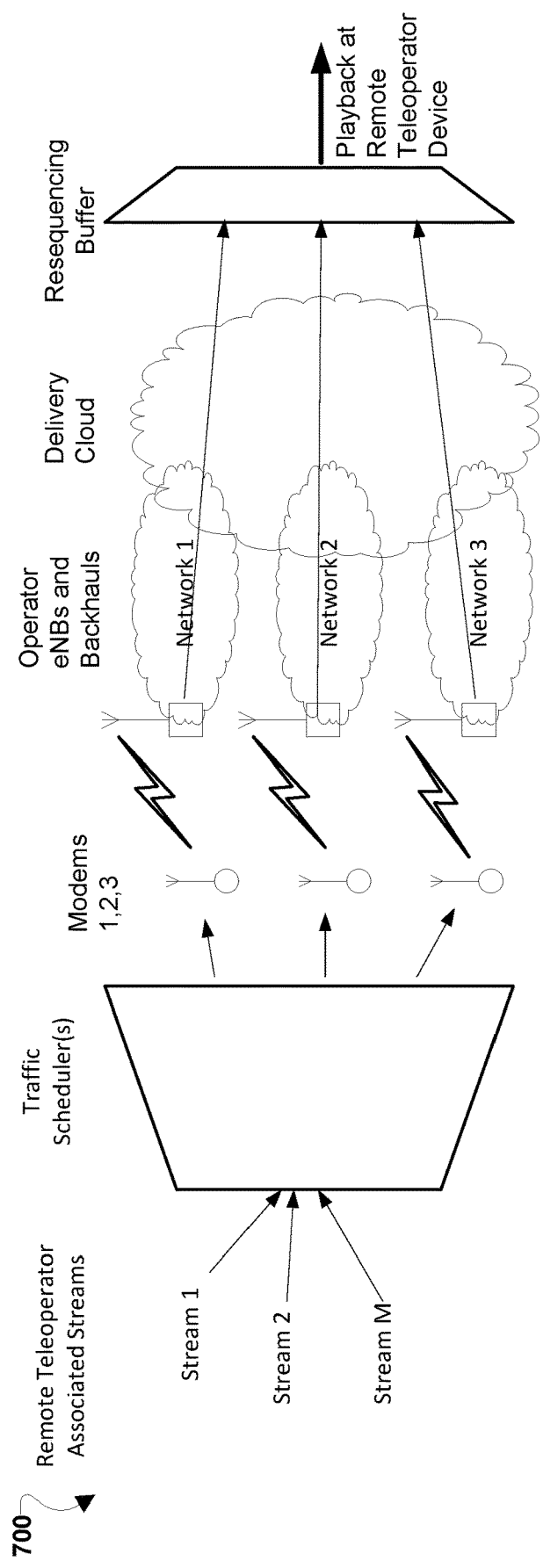
FIG. 7 illustrates a delivery chain of media streams within a multipath translator according to various embodiments.

FIG. 7 illustrates a delivery chain 700 of media streams within multipath source/translators, such as multipath translators 102, 202, 305, 404, 503, and/or 603 described above. As an example, the multipath source/translator may be an MPRTP translator. Each modem 1, 2, and 3 may periodically provide the observed bit rate and the queue size on its modem control (MC) interface to the traffic scheduler(s) at the multipath source/translator. As an example, RTCP feedback may provide overall end-to-end statistics. Multipath feedback, such as MPRTP feedback, may provide per path end-to-end statistics. Based on the received statistics, the traffic scheduler(s) may distribute packets, such as RTP packets, onto subflows on the available interfaces. As illustrated in FIG. 7, remote teleoperator associated streams 1 through M, such as RTP streams of media or other data (e.g., video data, audio data, sensor data, control commands, etc.), may be sent to the traffic schedulers and on to the modems 1, 2, and 3. Each modem may communicate with a different operator network 1, 2, and 3, such as eNode B's of different service provider run LTE networks. The operator networks 1, 2, and 3 may form pathways through the delivery cloud to provide the multipath streams, such as MPRTP streams, to the multipath destination device, such as a server or other remote teleoperator computing device. The multipath streams, such as MPRTP streams, may arrive at a resequencing buffer of the destination computing device and be output for playback (or other utilization) at the destination computing device. For example, the remote teleoperator associated streams 1 through M may be used by a remote teleoperator 110 to control the vehicle 112.

Figure 8:
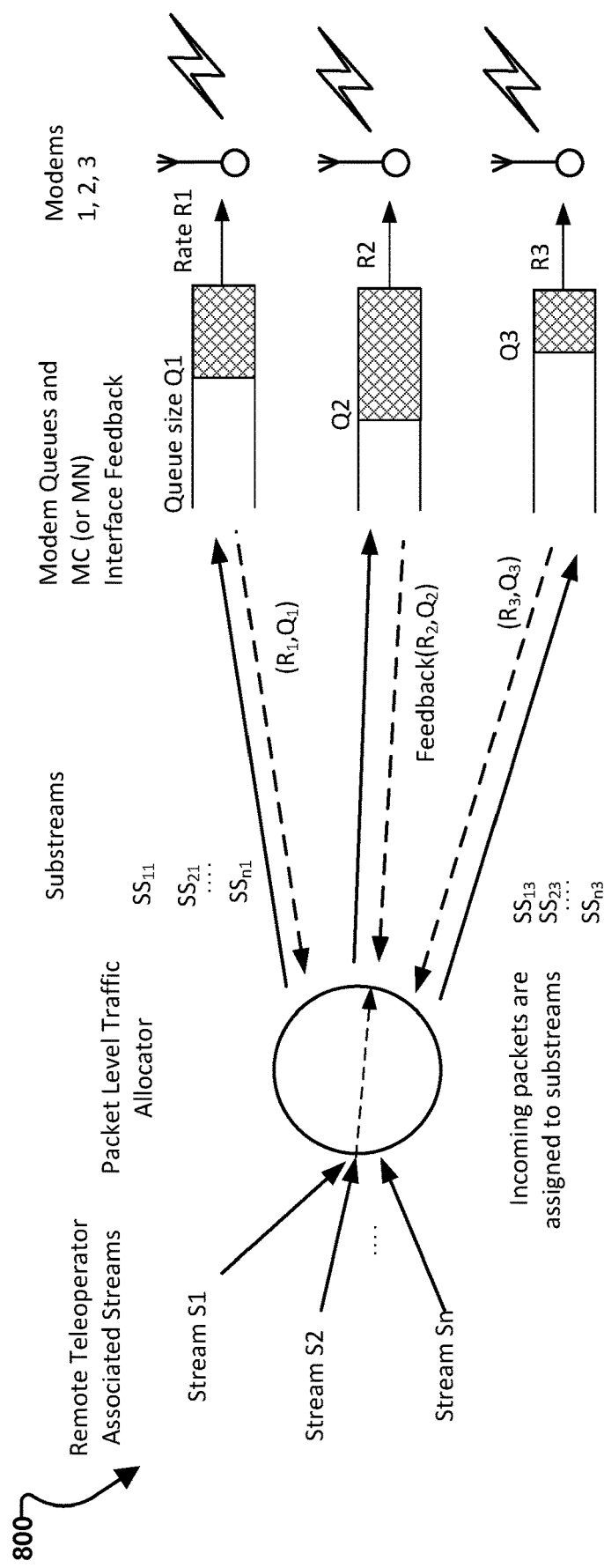
FIG. 8 illustrates packet level interactions between a packet scheduler and modems according to various embodiments.

FIG. 8 illustrates packet level interactions 800 between a packet scheduler and modems 1, 2, and 3 according to various embodiments. The packet scheduler and modems 1, 2, and 3 may be a scheduler and modem of a multipath source/translator, such as multipath translators 102, 202, 305, 404, 503, and/or 603 described above. Incoming packets of streams associated with remote teleoperation, such as streams of video packets, sensor data packets, or other type packets used for teleoperation, may be distributed to the modems for delivery. Each stream $S_i$ may be split into steams $S_{i1}, S_{i2}, \ldots, S_{in}$, where n is the number of modems available to the traffic scheduler, such as 3 modems. The traffic scheduler may take into account all available information and various levels of information sharing may occur between the RTP and MPRTP layers (or stacks), the traffic scheduler, the modems 1, 2, and 3, and the destination MPRTP device. In various embodiments, the packet scheduler may be centralized, decentralized, or a mix of the two. In a centralized packet scheduler, the scheduler process may operate on all streams simultaneously. In the distributed model, the scheduling parameters may be determined using inter-process communication, but the packet scheduler itself may operate on a single stream. In various embodiments, the modems 1, 2, and 3 may report their respective modem queue levels to the packet schedule via MC (or MN) interface feedback. For example, the modems 1, 2, and 3 may report their queue size (Qn) and transmission rate (Rn) as feedback on the MC (or MN) interface. The packet scheduler may assign incoming packets to the modems 1, 2, and 3 based at least in part on the queue size and transmission rates for the modems 1, 2, and 3. In various embodiments, a packet level scheduler may rely on rate and queue level feedback from the modems. In various embodiments, a stream level scheduler may derive the leaky bucket parameters of each sub-stream, based on rate level feedback from the modem. In various embodiments, an outer-loop scheduler may monitor end-to-end congestion beyond the air interface. The rates per interface may be reduced to accommodate network congestion.

In various embodiments, a scheduler may receive per path statistics through the MC (or MN) interface and/or through subflow path reporting. In various embodiments, modems may provide their available rates and queue sizes through the MC (or MN) interface. In various embodiments, the multipath source/translator may determine an estimate of the round-trip delay based on the exchange of sender and receiver RTCP reports with the destination multipath device. A subflow receiver report (SRR) may be sent from the destination multipath device including a reference to the last subflow sender report (SSR) received by the destination multipath device, and an indication of the delay between the reception of said subflow sender report (SSR) and the generation of the subflow receiver report (SRR) at the destination multipath device (i.e., SRR generation delay). The multipath source/translator may keep track of the generation time of the subflow sender report (SSR) (i.e., the SSR Tx time) and the receipt time of the subflow receiver report (SRR) (i.e., the SRR Rx time). Once the subflow receiver report (SRR) is received at the multipath source/translator, the multipath source/translator may determine a round trip time (RTT) estimate on the path on which the subflow sender report (SSR) and subflow receiver report (SRR) were exchanged according to the equation RTT= (SRR Rx time)−(SRR generation delay)−(SSR Tx time). Round trip time (RTT) estimates may also be referred to as end to end delay (EED) estimates. In various embodiments, the multipath source/translator may use knowledge of the path rate (Ri) and current queue length (Qi) to enhance the estimate according to the equation RTT=((SRR Rx time)− (Qi/Ri at SRR generation)−(SRR generation delay)−(SSR Tx time)), where the SRR generation time may be determined by subtracting the SSR generation delay from a SRR Tx time. To get the best estimate of queue length (Qi), SRR may be on path i after receiving a MC (or MN) report for that path.

Figure 9:
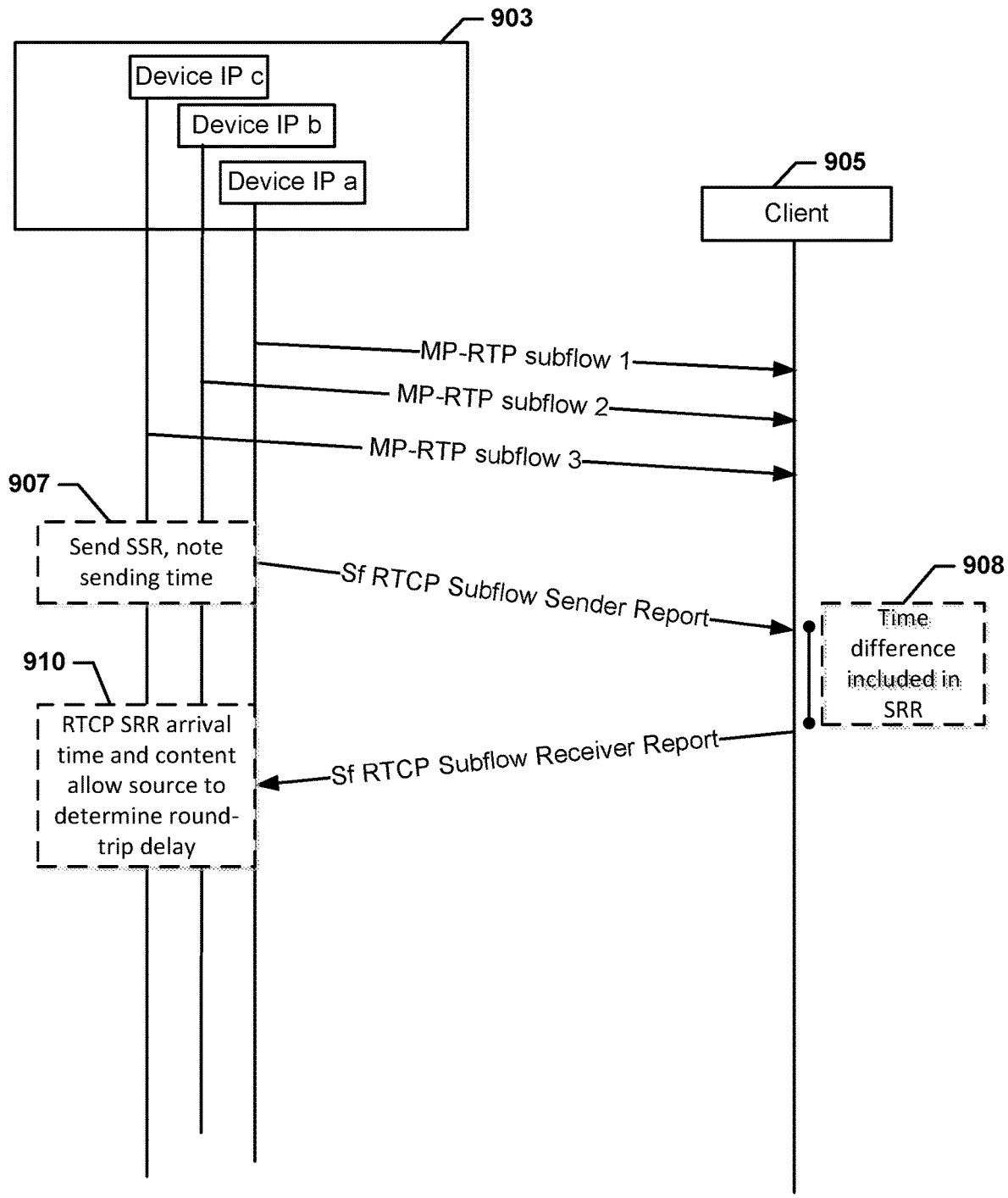
FIG. 9 is a call flow diagram illustrating a sender and receiver exchange between a multipath translator and destination computing device.

FIG. 9 is a call flow diagram illustrating a sender and receiver exchange of a SSR and SRR between a multipath source/translator 903 and destination (or client) computing device 905. The multipath source/translator 903 may be an in-vehicle computing device, such as in-vehicle computing device 102, and the destination (or client) computing device 905 may be a remote teleoperator computing device, such as remote teleoperator computing device 104. At some point after the MPRTP subflows are established a subflow sender report (SSR) may be sent in operation 907 and the sending time recorded by the multipath source/translator 903. In operation 908, the destination (or client) computing device 905 may determine the time difference between receiving the SSR and sending the subflow sender report (SRR) and include that time difference in the SRR. The multipath source/translator 903 may receive the SRR and based on the SRR receipt time and the time different between receiving the SSR and sending the SRR in the SRR determine the round trip delay (or end to end delay) in operation 910.

Figure 10:
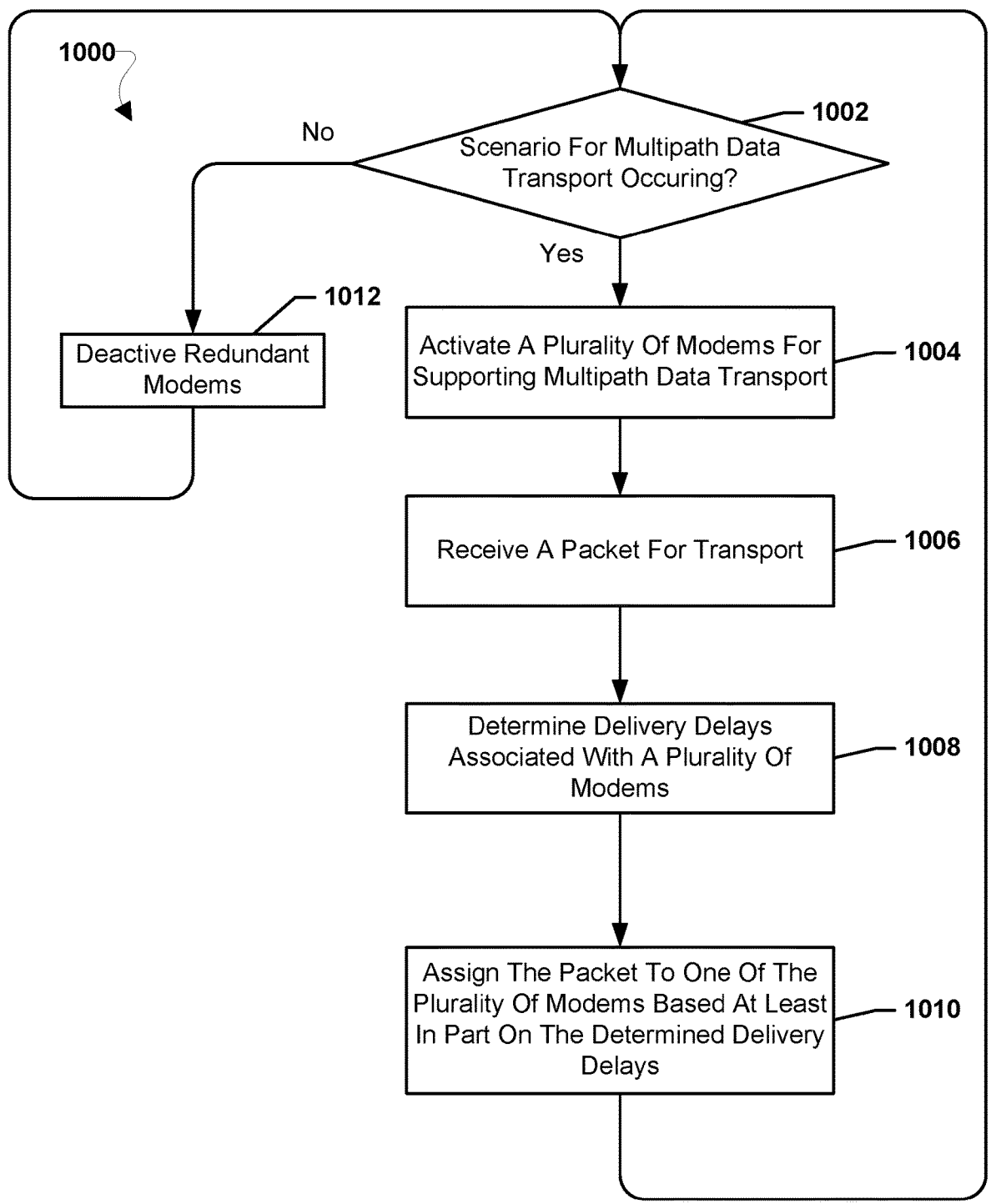
FIG. 10 is a process flow diagram illustrating an embodiment method for scheduling multipath transmissions.

FIG. 10 illustrates an embodiment method 1000 for scheduling multipath transmissions, such as MPRTP transmissions. In various embodiments, the operations of method 1000 may be performed by a scheduler running on a processor of an in-vehicle computing device, such as in computing devices 102 (FIGS. 1A and 1B), 202 (FIG. 2), 305 (FIG. 3), 404 (FIGS. 4A and 4B), 503 (FIG. 5), 603 (FIG. 6), 903 (FIG. 9).

In determination block 1002, the scheduler of the in-vehicle computing device may determine whether a scenario for multipath data transport is occurring. For example, the scheduler of the in-vehicle computing device may determine whether a scenario for remote teleoperation is occurring which may be a scenario for multipath data transmission. A scenario for remote teleoperation may be a situation involving variable and/or random characteristics that the vehicle computing device or another computing device within the vehicle recognizes as potentially benefiting from remote teleoperation by a remote teleoperator. For example, the high variability and potential randomness in the operations of the police officer 115 and the truck 114 in the merging scenario described with reference to FIG. 1A may be such that the autonomous control algorithms may not be capable of ensuring safe control the vehicle 112 in the scenario. The vehicle computing device or another computing device within the vehicle may recognize the scenario, for example by image detection recognizing the presence of the police officer 115, and the detection of the police officer 115 may be a trigger indicating a scenario for remote teleoperation is occurring. As another example, the scheduler of the in-vehicle computing device may determine whether a scenario for car-to-car mapping is occurring appropriate for multipath data transmission. Car-to-car mapping may benefit from the transmission of data from the vehicle, such as vehicle 112, to another vehicle, such as truck 114, to enable the two vehicles to benefit from all or a portion of the same sensor data map, e.g., a LIDAR image of the vehicle vicinity. Further examples of scenarios for multipath data transmission that the scheduler of the in-vehicle computing device may recognize include: a scenario in which the transport of on vehicle sensor data (e.g., tachometers, accelerometers, etc.) may be required to remote vehicle diagnostic services; a scenario in which the transport of vehicle camera images to other vehicles may be needed to alert those other vehicles of traffic patterns; and a scenario in which the transport of sensor data or camera images to other vehicles or traffic monitoring services to report the status of traffic control equipment may be needed (e.g., whether a traffic light is green or red, whether a traffic light is working or disabled, the posted speed limit for a road as indicated by a highway sign, etc.).

In response to determining that a scenario for multipath data transport is occurring (i.e., determination block 1002="Yes"), the scheduler of the in-vehicle computing device may activate a plurality of modems for supporting multipath data transport in block 1004. The plurality of modems may include two, three, four, or more modems. The plurality of modems may be different modems, such as different LTE modems. Each of the plurality of modems may be configured to establish connections via different service providers. Upon activation, each of the plurality of modems may establish its own respective different delivery path through the delivery cloud to a remote teleoperator computing device, such as computing device 104 (FIGS. 1A and 1B), 204 (FIG. 2), 302 (FIG. 3), 505 (FIG. 5), 605 (FIG. 6), and 905 (FIG. 9). The different delivery paths may each be separate delivery paths through the delivery cloud routed from distinct IP addresses of the in-vehicle computing device to one or more IP addresses of the remote teleoperator computing device. For example, each of the activated plurality of modems may have its own delivery path with a unique IP address for the in-vehicle computing device side while all delivery paths may have the same IP address for the remote teleoperator computing device side. As another example, in remote scenarios, the remote teleoperator computing device side may have multiple IP addresses, each valid on a different delivery network. In various embodiments, each of the plurality of modems and their respective delivery paths may be assigned different priorities, such as one delivery path being prioritized over the other delivery paths. Delivery paths may be prioritized relative to one another based on one or more path attributes associated with the delivery paths, such as cost, bandwidth, quality-of-service (QoS), etc.

In block 1006, the scheduler of the in-vehicle computing device may receive a packet for transport, such as a packet carrying data supporting remote teleoperation. Data supporting remote teleoperation may include data generated by cameras, sensors, or other systems of a vehicle to be used by a remote teleoperator to control the vehicle. The data may be packetized and received from encoders or other signal processing devices for transport to remote teleoperator computing device. For example, the packet may be a packet of various RTP streams for transport, such as media streams received from encoders, for transport to a backend server or other remote teleoperator computing device via multipath transmissions.

In block 1008, the scheduler of the in-vehicle computing device may determine delivery delays associated with a plurality of modems. As discussed above, in various embodiments, the scheduler of the in-vehicle computing device may receive indications of per path statistics for delivery paths associated with each available modem, such as 2, 3, 4, or more modems available for transport. In various embodiments, a scheduler of the in-vehicle computing device may receive per path statistics through the MC (or MN) interface and/or through subflow path reporting. In various embodiments, modems may provide their available delivery rates and queue sizes through the MC (or MN) interface. In various embodiments, delivery delays may be determined based on one or more of queue sizes of the plurality of modems, delivery rate estimates of the plurality of modems, and end to end delay estimates.

In various embodiments, the scheduler of the in-vehicle computing device may determine a delivery delay associated with one of a plurality of modems (i) based at least in part on the delivery rate estimate for the modem ($R_i$) and the queue size of the modem ($Q_i$). For example, the scheduler of the in-vehicle computing device may determine the delivery delay as the packet size (PS) of the packet plus the queue size of the modem ($Q_i$) divided by the delivery rate estimate for the modem ($R_i$) plus the end to end delay (EDD) estimate for the delivery path associated with the modem (i.e., delivery delay=$((PS+Q_i)/R_i)+EDD$). A packet size (PS) may be determined from header information of the packet. A delivery rate estimate for the modem ($R_i$) and the queue size of the modem ($Q_i$) may be determined from reports received via the MC (or MN) interface and/or through subflow path reporting. An end to end delay (EDD) estimate may be determined according to the operations discussed above with reference to FIGS. 8 and 9. In various embodiments, queue size of the modem ($Q_i$) may be updated when the packet is received by subtracting the elapsed time since the last queue size report was received (ElapsedTime) multiplied by the delivery rate estimate for the modem ($R_i$) from the last reported queue size ($Q_i$) (i.e., $Q_i=Q_i-(ElapsedTime-R_i)$).

In block 1010, the scheduler of the in-vehicle computing device may assign the packet to the one of the plurality of modems based at least in part on the determined delivery delays. In various embodiments the scheduler of the in-vehicle computing device may assign the packet to the one of the plurality of modems based at least in part on the determined delivery delays by assigning the packet to the modem with the lowest delivery delay among the plurality of delivery delays. In this manner, by comparing the delivery delays determined for each of a plurality of modems, such as 2, 3, 4, or more modems, the scheduler of the in-vehicle computing device may minimize the delay expected to be experienced in sending the packet at the time the packet is scheduled. In various embodiments, the queue size of the modem ($Q_i$) may be updated between queue reports by adding the packet size (PS) of a packet assigned to the modem to the last determined queue size (i.e., $Q_i=Q_i+PS$).

In various embodiments, the scheduler of the in-vehicle computing device may further assign packets for transport based on delivery delays and path priorities associated with the plurality of modems. For example, as discussed above, delivery paths for the available modems, such as modems 1, 2, and 3, may be associated with different priorities based on one or more path attributes such as cost of using delivery paths, bandwidth of delivery paths, QoS of delivery paths, etc. The scheduler of the in-vehicle computing device may account for those relative priorities when assigning packets for transport. For example, one delivery path may be the highest priority path (e.g., due to lowest cost), and the scheduler of the in-vehicle computing device may determine whether the delivery delay of the modem of that path is above a delay threshold (e.g., 0.2 seconds). In response to determining the delivery delay is below the delay threshold, the scheduler of the in-vehicle computing device may assign the packet to that modem. In response to determining the delivery delay is at or above the delay threshold, the scheduler of the in-vehicle computing device may assign the packet to the modem with the lowest delivery delay. In this manner, as long as delivery delay for the highest priority path is below the delay threshold, packets may be biased to the modem of the highest priority path.

In response to assigning the packet to a modem, the scheduler of the in-vehicle computing device may return to block 1002 and determine again whether a scenario for multipath data transport is occurring. In response to determining that a scenario for multipath transport is not occurring (i.e., determination block 1002="No"), the scheduler of the in-vehicle computing device may deactivate redundant modems in block 1012. Deactivating redundant modems may include deactivating all or a portion of the modems. For example, all but the modem associated with a highest priority path may be deactivated. As another example, all the modems may be deactivated. By deactivating redundant modems, computing resources and/or power may be conserved and costs associated with maintaining unneeded delivery paths may be avoided.

In various embodiments, the scheduler of the in-vehicle computing device may be configured to reduce the delivery rate estimate or bandwidth reported (such as on the MC (or MN) interface) by a percentage to ensure that bandwidth is available on a modem for use in transporting other traffic. Such a bandwidth backoff may be applied to all available modems or to a subset of available modems, such as just a preferred modem. In various embodiments, the percentage reduction may be adjusted depending on the confidence in the delivery rate estimate or bandwidth reported (such as the delivery rate estimate or bandwidth reported on the MC (or MN) interface).

Figure 11:
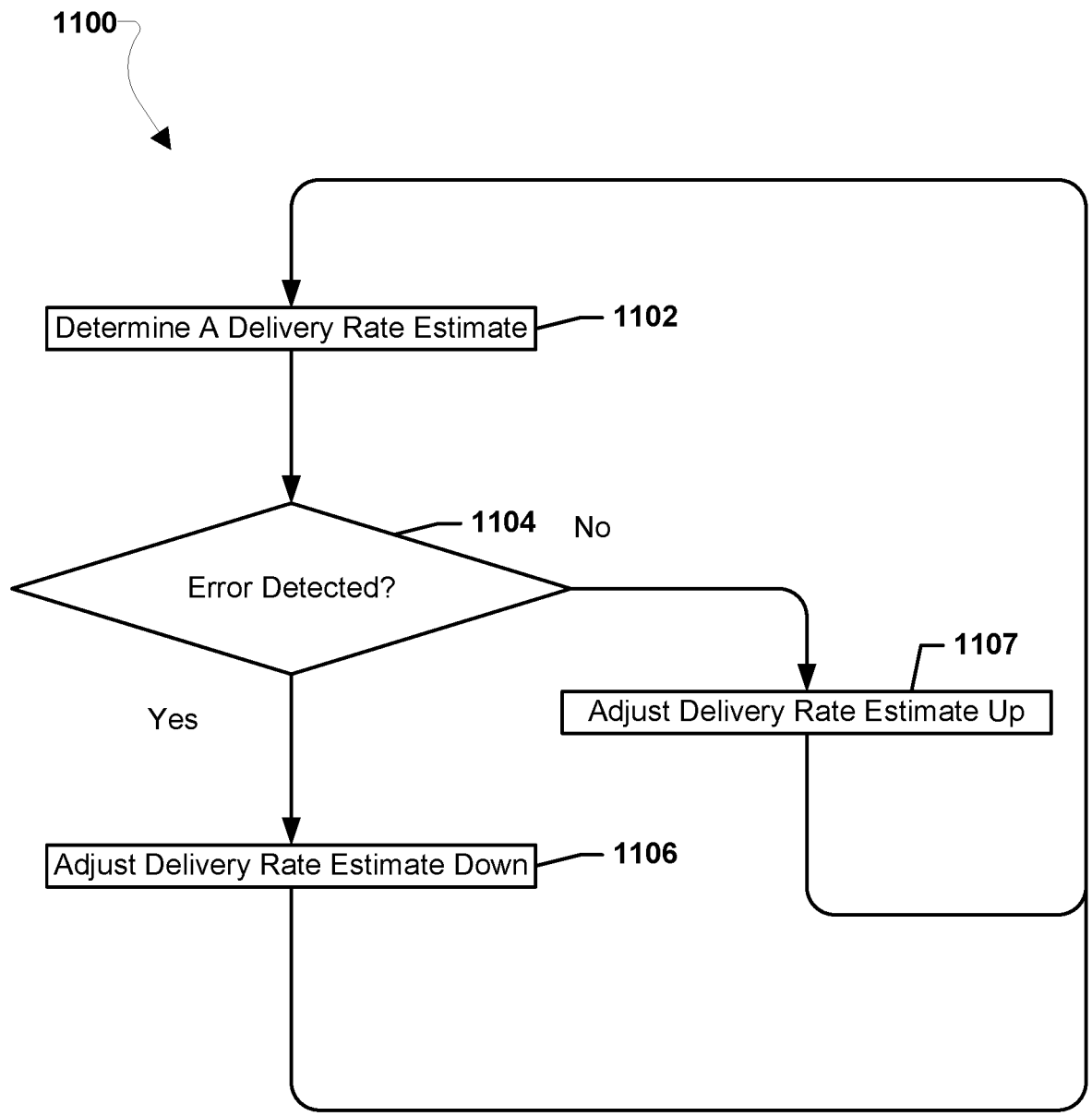
FIG. 11 is a process flow diagram illustrating an embodiment method for adjusting delivery rate estimates based on error detections.
Figure 12:
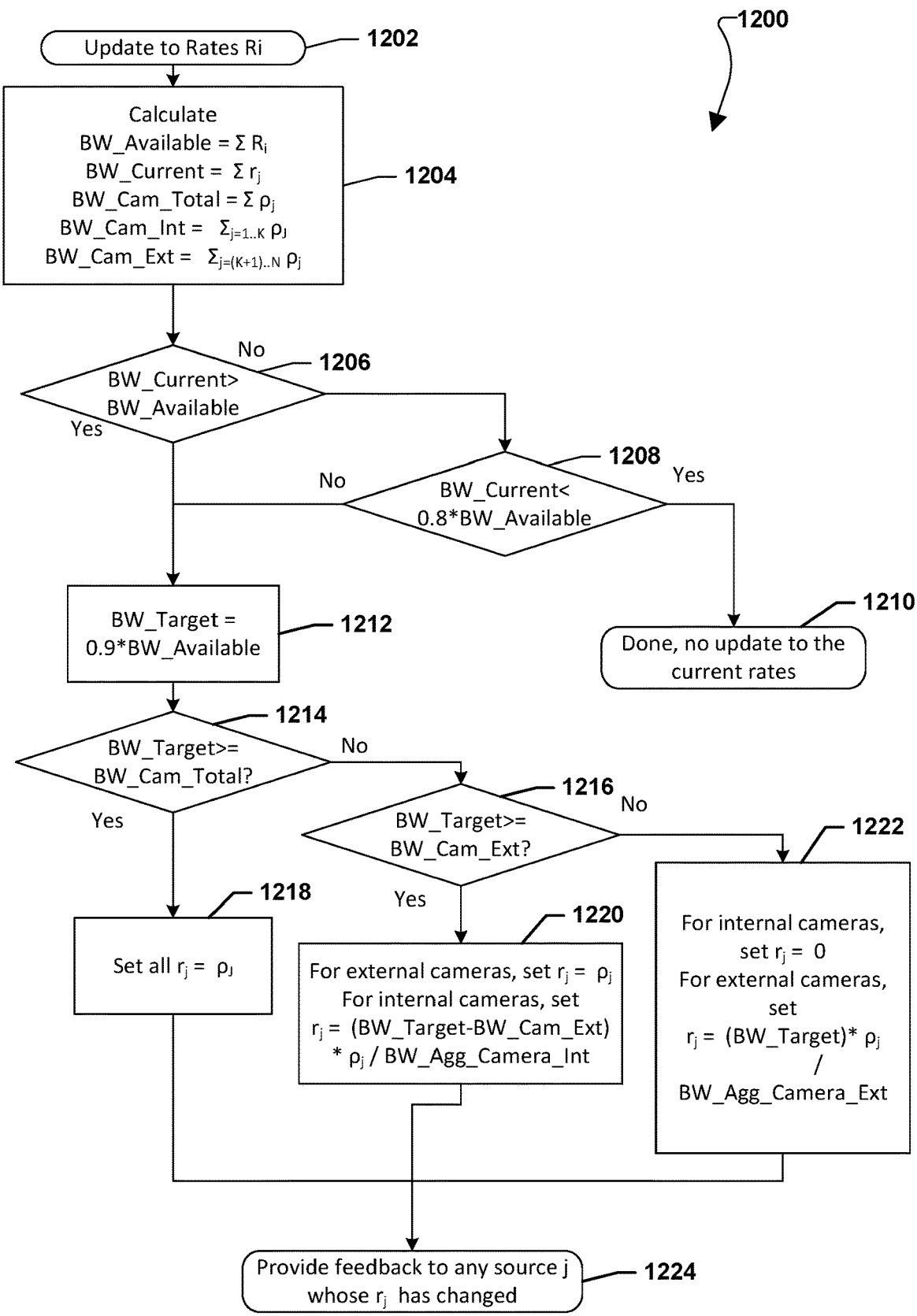
FIG. 12 is a process flow diagram illustrating an embodiment method for adjusting media generation rates.

FIG. 11 illustrates an embodiment method 1100 for adjusting delivery rate estimates based on error detections. In various embodiments, the operations of method 1100 may be performed by a scheduler running on a processor of an in-vehicle computing device, such as in computing devices 102 (FIGS. 1A and 1B), 202 (FIG. 2), 305 (FIG. 3), 404 (FIGS. 4A and 4B), 503 (FIG. 5), 603 (FIG. 6), 903 (FIG. 9). In various embodiments, the operations of method 1100 may be performed in conjunction with the operations of method 1000 (FIG. 10) and/or method 1200 (FIG. 12).

In block 1102 the scheduler of the in-vehicle computing device may determine a delivery rate estimate. In various embodiments, the scheduler of the in-vehicle computing device may determine the delivery rate estimate based on path statistics delivered through the MC (or MN) interface and/or through subflow path reporting for an available modem. Path statistics may include a reported delivery rate estimate. In various embodiments, the delivery rate estimate may be a delivery rate estimate the scheduler adjusted by a percentage to ensure that bandwidth was available on a modem for use in transporting other traffic.

In determination block 1104, the scheduler of the in-vehicle computing device may determine whether an error is detected associated with the path for the modem. In various embodiments, errors may be detected by the scheduler of the in-vehicle computing device receiving an error report from the modem, or from reports received from the peer device. In response to determining no error is detected (i.e., determination block 1104="No"), the scheduler of the in-vehicle computing device adjust the delivery rate estimate up in block 1107 and may return to block 1102 to determine a next delivery rate estimate. For example, when errors are not detected in a reporting period, the error factor may be increased by adding a percentage point to the error factor. In an embodiment, the scheduler of the in-vehicle computing device may update the delivery rate estimate according to fixed equations. As another example, when no error is detected the rate may be increased by a fixed percentage. In various embodiments, when the rate is at 100%, no further upward adjustment may be performed. In various embodiments, delivery rate adjustments may be made every round trip time.

In response to determining an error is detected (i.e., determination block 1104="Yes"), the scheduler of the in-vehicle computing device may adjust the delivery rate estimate in block 1106. Adjusting the delivery rate estimate may occur in an outer-loop processes that occurs in parallel to receiving and assigning packets by the scheduler. In an embodiment, the scheduler of the in-vehicle computing device may update the delivery rate estimate based on an error factor. For example, the updated delivery rate estimate may be determined based on the current delivery rate estimate times the error factor. The error factor may start at 100%. When an error is detected, the error factor may be reduced by half. In an embodiment, the scheduler may update the delivery rate estimate according to fixed equations. For example, when an error is detected, the rate may be divided by half. In various embodiments, the scheduler may select between the reported delivery rate estimate from the modem and the adjusted delivery rate estimate when determining a delivery delay. For example, the scheduler may select the lower delivery rate estimate of the two when assigning packets.

In various embodiments, a centralized scheduler for an in-vehicle computing device may adjust content generation rates based on available bandwidth. In various embodiments, adjusting content generation rates may include distributing bandwidth across various media streams and/or prioritizing media streams. In various embodiments a scheduler for an in-vehicle computing device may determine an adjusted media generation rate based at least in part on an available bandwidth and control one or more encoders providing packets to the scheduler for transport according to the adjusted media generation rates. For example, stream rate per path may be determined based on MC (or MN) feedback and the outer-loop adjustment mentioned earlier, and the scheduler may adjust the overall media generation rate to fit within an available bandwidth, such as between 0.8 and 1.0 of the aggregate path transmission rate. The scheduler for the in-vehicle computing device may distribute the bandwidth over the streams and prioritize between media sources, such as cameras. The scheduler for the in-vehicle computing device may provide feedback to the encoders such that the encoders adjust how packets are sent to the scheduler. In various embodiments, the scheduler for the in-vehicle computing device may know the path rate estimates as determined in the scheduling algorithm. From the SDP, the scheduler may know the average rate $\rho_j$ of every source j. The scheduler for the in-vehicle computing device may be configured with a target ratio, A, and a minimum ratio, B, for the camera rate. The scheduler for the in-vehicle computing device may send a rate increase feedback if the utilization is below the minimum target. The scheduler for the in-vehicle computing device may send a rate reduction feedback if the utilization is above 100% (or above another factor C, (e.g., 95% instead of 100%)). In both cases the target overall rate may be the product of the target ratio multiplied by the overall rate.

FIG. 12 is a process flow diagram illustrating an embodiment method for adjusting media generation rates. In various embodiments, the operations of method 1200 may be performed by a scheduler running on a processor of an in-vehicle computing device, such as in computing devices 102 (FIGS. 1A and 1B), 202 (FIG. 2), 305 (FIG. 3), 404 (FIGS. 4A and 4B), 503 (FIG. 5), 603 (FIG. 6), 903 (FIG. 9). In various embodiments, the operations of method 1200 may be performed in conjunction with the operations of method 1000 (FIG. 10) and/or method 1100 (FIG. 11).

In block 1202 the scheduler for the in-vehicle computing device may update delivery rate estimates for the modems available. For example, delivery rate estimate $R_i$ may equal the $\min(R_i^*$, Rate reported by a MC (or MN) interface) for each path i. For the purpose of rate control, the rate may be reduced by the estimate of header overhead according to the equation $R_i = \min(R_i^*$, Rate reported by MC (or MN))*(1−$H_i$/PS), where PS is the payload in use and is assumed to be 1280 bytes and, $H_i$ is the header size which includes the header size for the VPN headers, and those of the IPSec headers. In block 1204 the scheduler for the in-vehicle computing device may determine the overall available bandwidth, the current bandwidth being used, the bandwidth needed by the total cameras, and the bandwidth needed by all the cameras, the bandwidth needed by the internal cameras, and the bandwidth needed by the external cameras. For each source $r_j$, the scheduler for the in-vehicle computing device may store the following two values: $\rho_j$ (the average rate reported in the SDP for source j) and $r_j$ (the rate fed back to the source previously). The scheduler for the in-vehicle computing device may initialize all $r_j$ to $\rho_j$. The scheduler for the in-vehicle computing device may calculate the aggregate bandwidth needed to serve all the cameras at the desired rate according to BW_Agg_Camera_Total=$\Sigma_{j=1\ldots M}(\rho_j)$, where M is the number of sources. The scheduler for the in-vehicle computing device may calculate the aggregate bandwidth needed to serve the external cameras at the desired rate according to BW_Agg_Camera_Ext=$\Sigma_{j=1\ldots K}(\rho_j)$, where K is the number of external sources, 1 ... K are the external sources, and, K+1 ... M are the internal sources. The scheduler for the in-vehicle computing device may calculate the aggregate bandwidth needed to serve the external cameras at the desired rate according to BW_Agg_Camera_Int=$\Sigma_{j=(K+1)\ldots N}(\rho_j)$. The scheduler for the in-vehicle computing device may calculate the aggregate bandwidth needed to serve the cameras at the current calculated rate BW_Current=$\Sigma_{j=1\ldots M}(r_j)$ and calculate the aggregate available bandwidth BW_Available=$\Sigma_{i=1\ldots N}(R_i)$, where Ri is the rate estimate for path i according to the scheduling algorithm and N is the number of paths.

In determination block 1206 the scheduler for the in-vehicle computing device may determine whether the current bandwidth being used is higher than the available bandwidth. In response to determining that the current bandwidth being used is not higher than the available bandwidth (i.e., determination block 1206="No"), the scheduler for the in-vehicle computing device may determine whether the current bandwidth being used is less than the 0.8 of the available bandwidth in determination block 1208. In response to determining that the current bandwidth being used is less than the 0.8 of the available bandwidth (i.e., determination block 1208="Yes"), the process may complete in block 1210 as no update to the current rates may be needed.

In response to determining that the current bandwidth being used is not higher than the available bandwidth (i.e., determination block 1206="No") or the current bandwidth being used is less than the 0.8 of the available bandwidth (i.e., determination block 1208="Yes"), the scheduler for the in-vehicle computing device may set the bandwidth target to 0.9 of the bandwidth available in block 1212. In determination block 1214 the scheduler for the in-vehicle computing device may determine whether the bandwidth target is greater than or equal to the bandwidth needed by all the cameras. In response to determining that the bandwidth target is greater than or equal to the bandwidth needed by all the cameras (i.e., determination block 1214="Yes"), the scheduler for the in-vehicle computing device may, in block 1218, set all rates for the encoders to the average rate reported in the SDP.

In response to determining that the bandwidth target is less than the bandwidth needed by all the cameras (i.e., determination block 1214="No"), the scheduler for the in-vehicle computing device may determine whether the bandwidth target is greater than or equal to the bandwidth of the external cameras in determination block 1216. In response to determining that the bandwidth target is greater than or equal to the bandwidth of the external cameras (i.e., determination block 1216="Yes"), the scheduler for the in-vehicle computing device may adjust the rates in block 1220 for internal and external cameras. For example, the scheduler for the in-vehicle computing device may set all $r_j = \rho_j$ for j<=K and set all $r_j$=(BW_Target−BW_Agg_Camera_Ext)*$\rho_j$/BW_Agg_Camera_Int for j>K.

In response to determining the bandwidth target is greater less than the bandwidth of the external cameras (i.e., determination block 1216="No"), the scheduler for the in-vehicle computing device may set the rates of the internal cameras to zero and adjust the rates of the external cameras in block 1222. For example, the scheduler for the in-vehicle computing device may set all $r_j$=BW_Target*$\rho_j$/BW_Agg_Camera_Ext for j<=K and set all $r_j$=0 for j>K.

In block 1224 the scheduler for the in-vehicle computing device may provide feedback to the sources whose rate has changed.

Figure 13:
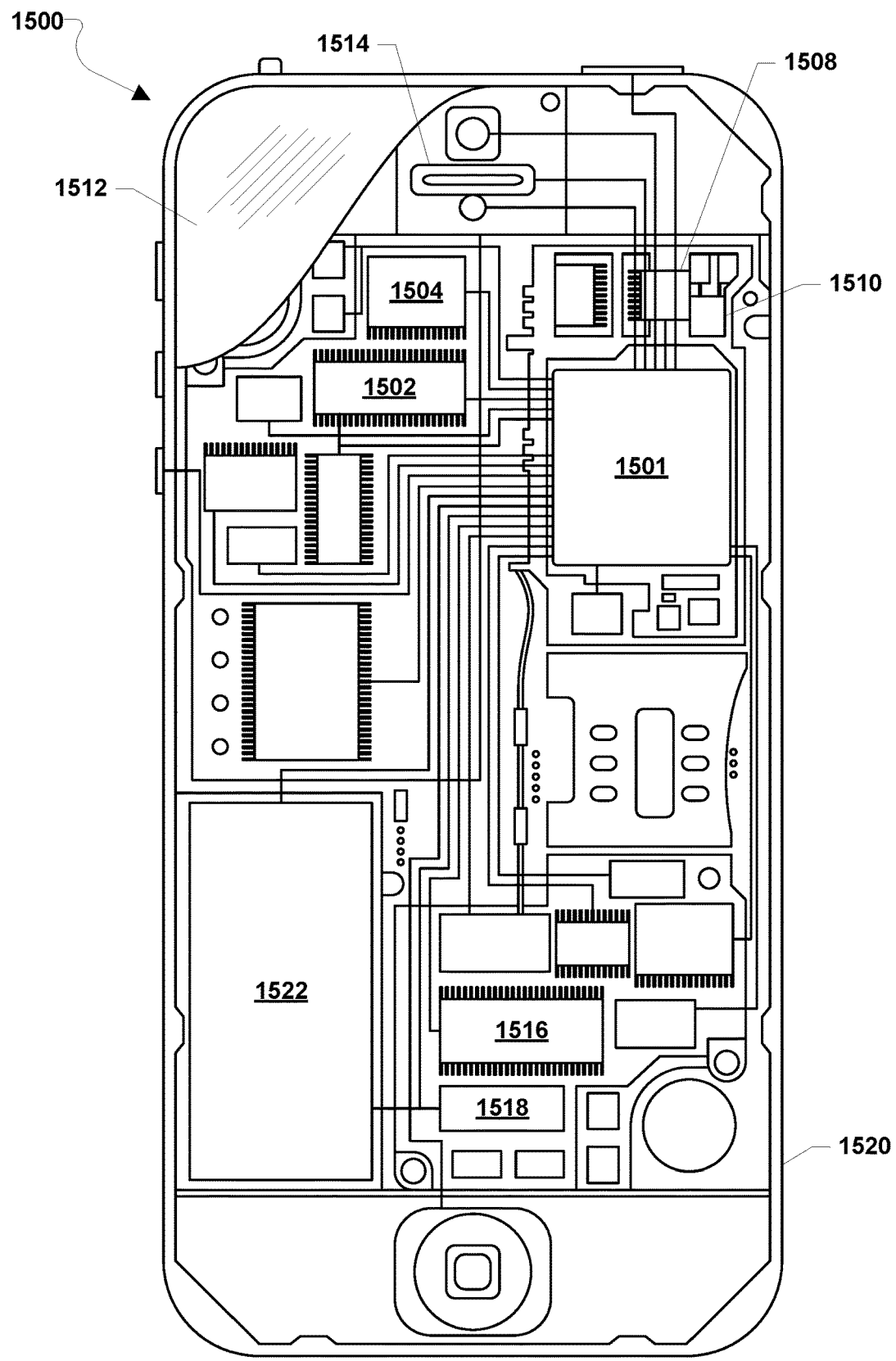
FIG. 13 is a component diagram of an example computing device suitable for use with the various embodiments.

The various embodiments (including, but not limited to, embodiments discussed above with reference to FIGS. 1-12) may be implemented in any of a variety of the computing devices (e.g., mobile devices), an example of which is illustrated in FIG. 13. For example, the mobile device 1500 may include a processor 1501 coupled to a touch screen controller 1504 and an internal memory 1502. The processor 1501 may be one or more multicore integrated circuits (ICs) designated for general or specific processing tasks. The internal memory 1502 may be volatile or non-volatile memory, and may also be secure and/or encrypted memory, or unsecure and/or unencrypted memory, or any combination thereof. The touch screen controller 1504 and the processor 1501 may also be coupled to a touch screen panel 1512, such as a resistive-sensing touch screen, capacitive-sensing touch screen, infrared sensing touch screen, etc. The mobile device 1500 may have one or more radio signal transceivers 1508 (e.g., Peanut®, Bluetooth®, Zigbee®, Wi-Fi, RF, cellular, etc.) and antennae 1510, for sending and receiving, coupled to each other and/or to the processor 1501. The transceivers 1508 and antennae 1510 may be used with the above-mentioned circuitry to implement the various wireless transmission protocol stacks and interfaces. The mobile device 1500 may include one or more cellular network wireless modem chips 1516, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor.

The mobile device 1500 may include a peripheral device connection interface 1518 coupled to the processor 1501. The peripheral device connection interface 1518 may be singularly configured to accept one type of connection, or multiply configured to accept various types of physical and communication connections, common or proprietary, such as USB, FireWire, Thunderbolt, Ethernet, or PCIe. The peripheral device connection interface 1518 may also be coupled to a similarly configured peripheral device connection port (not shown). The mobile device 1500 may also include speakers 1514 for providing audio outputs.

The mobile device 1500 may also include a housing 1520, constructed of a plastic, metal, or a combination of materials, for containing all or some of the components discussed herein. The mobile device 1500 may include a power source 1522 coupled to the processor 1501, such as a disposable or rechargeable battery. The rechargeable battery may also be coupled to the peripheral device connection port to receive a charging current from a source external to the mobile device 1500.

Figure 14:
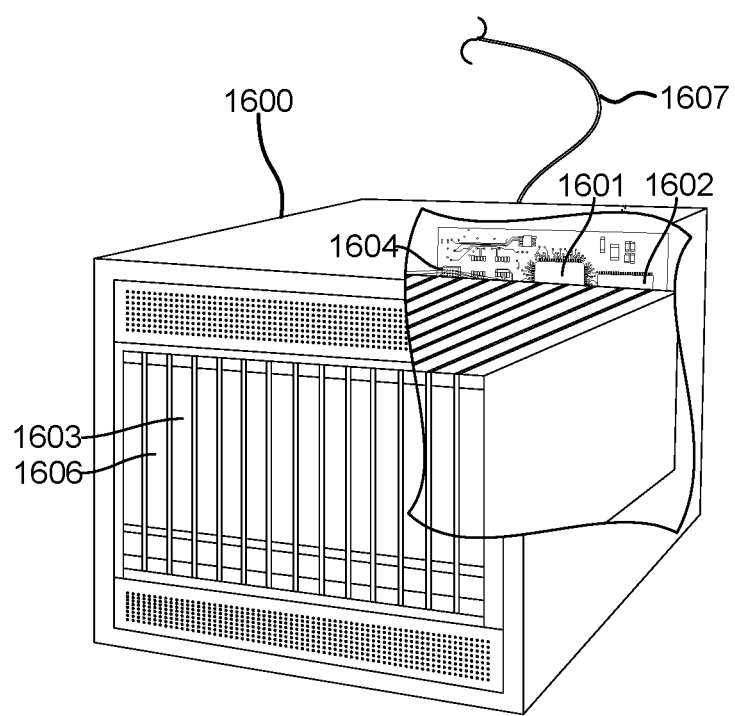
FIG. 14 is a component diagram of an example server suitable for use with the various embodiments.

The various embodiments (including, but not limited to, embodiments discussed above with reference to FIGS. 1-12) may also be implemented on any of a variety of commercially available server devices, such as the server 1600 illustrated in FIG. 14. Such a server 1600 typically includes a processor 1601 coupled to volatile memory 1602 and a large capacity nonvolatile memory, such as a disk drive 1604. The server 1600 may also include a floppy disc drive, compact disc (CD) or DVD disc drive 1606 coupled to the processor 1601. The server 1600 may also include one or more wired or wireless network transceivers 1603, such one or more network access ports and/or wired or wireless modems (e.g., one wireless modem, two wireless modems, three wireless modems, four wireless modems, or more than four wireless modems), coupled to the processor 1601 for establishing network interface connections with one or more communication networks 1607, such as a local area network (e.g., Ethernet, etc.) coupled to other computing devices and/or servers, the Internet, the public switched telephone network, and/or one or more cellular networks (e.g., CDMA, TDMA, GSM, PCS, 3G, 4G, LTE, or any other type of cellular network).

The processors 1501 and 1601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1501 and 1601. The processors 1501 and 1601 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1501 and 1601 including internal memory or removable memory plugged into the device and memory within the processors 1501 and 1601 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for multipath transmission from a vehicle, comprising:
   receiving a packet for transport in a scheduler running on a processor of an in-vehicle computing device;
   determining, in the scheduler, delivery delays associated with a plurality of modems;
   assigning, by the scheduler, the packet to two or more of the plurality of modems based at least in part on the determined delivery delays, wherein:
   the scheduler determines the delivery delays associated with the plurality of modems and assigns the packet to the two or more of the plurality of modems in response to a determination that a scenario for multipath transmission is occurring; and
   determining the delivery delays associated with the plurality of modems comprises, for each modem of the plurality of modems, determining a respective modem's respective delivery delay based on a packet size of the packet, a queue size reported by the respective modem, a delivery rate estimate for the respective modem, and an end-to-end delivery delay estimate for the respective modem; and transmitting the packet from the assigned two or more of the plurality of modems along a multipath to a remote teleoperator computing device.

2. The method of claim 1, wherein assigning, by the scheduler, the packet to the two or more of the plurality of modems based at least in part on the determined delivery delays comprises assigning, by the scheduler, the packet to the two or more of the plurality of modems based at least in part on the determined delivery delays and a path priority.

3. The method of claim 1, further comprising adjusting, by the scheduler, delivery rate estimates of one or more of the plurality of modems based on an end-to-end error detection mechanism.

4. The method of claim 1, further comprising:
determining, in the scheduler, an adjusted media generation rate based at least in part on a respective available bandwidth for each of the plurality of modems; and
controlling, by the scheduler, one or more encoders providing packets to the scheduler for transport according to the adjusted media generation rate.

5. The method of claim 1, wherein the plurality of modems is three or more modems.

6. The method of claim 1, wherein the scenario for multipath transmission is an ongoing scenario during operation of the vehicle.

7. The method of claim 1, wherein:
the packet for transport supports remote teleoperation of the vehicle; and
the scenario for multipath transmission is a scenario for remote teleoperation of the vehicle.

8. The method of claim 1, wherein the multipath transmission is a Multipath Real-Time Transport Protocol (MPRTP) transmission.

9. An in-vehicle computing device, comprising:
a processor configured with processor-executable instructions to perform operations comprising:
receiving a packet for transport;
determining delivery delays associated with a plurality of modems;
assigning the packet to two or more of the plurality of modems based at least in part on the determined delivery delays, wherein:
determining the delivery delays associated with the plurality of modems and assigning the packet to the two or more of the plurality of modems are performed in response to a determination that a scenario for multipath transmission is occurring; and
determining the delivery delays associated with the plurality of modems comprises, for each modem of the plurality of modems, determining a respective modem's respective delivery delay based on a packet size of the packet, a queue size reported by the respective modem, a delivery rate estimate for the respective modem, and an end-to-end delivery delay estimate for the respective modem; and
transmitting the packet from the assigned two or more of the plurality of modems along a multipath to a remote teleoperator computing device.

10. The in-vehicle computing device of claim 9, wherein the processor is configured with processor-executable instructions to perform operations such that assigning the packet to the two or more of the plurality of modems based at least in part on the determined delivery delays comprises assigning the packet to the two or more of the plurality of modems based at least in part on the determined delivery delays and a path priority.

11. The in-vehicle computing device of claim 9, wherein the processor is configured with processor-executable instructions to perform operations further comprising adjusting delivery rate estimates of one or more of the plurality of modems based on an end-to-end error detection mechanism.

12. The in-vehicle computing device of claim 9, wherein the processor is configured with processor-executable instructions to perform operations further comprising:
determining an adjusted media generation rate based at least in part on a respective available bandwidth for each of the plurality of modems; and
controlling one or more encoders providing packets for transport according to the adjusted media generation rate.

13. The in-vehicle computing device of claim 9, wherein the processor is configured with processor-executable instructions to perform operations such that the plurality of modems is three or more modems.

14. The in-vehicle computing device of claim 9, wherein the processor is configured with processor-executable instructions to perform operations such that the scenario for multipath transmission is an ongoing scenario during operation of the vehicle.

15. The in-vehicle computing device of claim 9, wherein the processor is configured with processor-executable instructions to perform operations such that:
the packet for transport supports remote teleoperation of the vehicle; and
the scenario for multipath transmission is a scenario for remote teleoperation of the vehicle.

16. The in-vehicle computing device of claim 9, wherein the processor is configured with processor-executable instructions to perform operations such that the multipath is a Multipath Real-Time Transport Protocol (MPRTP) transmission.

17. An in-vehicle computing device, comprising:
means for receiving a packet for transport;
means for determining delivery delays associated with a plurality of modems;
means for assigning the packet to two or more of the plurality of modems based at least in part on the determined delivery delays, wherein:
determining the delivery delays associated with the plurality of modems and assigning the packet to the two or more of the plurality of modems are performed in response to a determination that a scenario for multipath transmission is occurring; and
the means for determining the delivery delays associated with the plurality of modems comprises, for each modem of the plurality of modems, means for determining a respective modem's respective delivery delay based on a packet size of the packet, a queue size reported by the respective modem, a delivery rate estimate for the respective modem, and an end-to-end delivery delay estimate for the respective modem; and
means for transmitting the packet from the assigned two or more of the plurality of modems along a multipath to a remote teleoperator computing device.

18. The in-vehicle computing device of claim 17, wherein the means for assigning the packet to the two or more of the plurality of modems based at least in part on the determined delivery delays comprises means for assigning the packet to the two or more of the plurality of modems based at least in part on the determined delivery delays and a path priority.

19. The in-vehicle computing device of claim 17, further comprising means for adjusting delivery rate estimates of one or more of the plurality of modems based on an end-to-end error detection mechanism.

20. The in-vehicle computing device of claim 17, further comprising:
   means for determining an adjusted media generation rate based at least in part on a respective available bandwidth for each of the plurality of modems; and
   means for controlling one or more encoders providing for transport according to the adjusted media generation rate.

21. The in-vehicle computing device of claim 17, wherein the plurality of modems is three or more modems.

22. The in-vehicle computing device of claim 17, wherein the scenario for multipath transmission is an ongoing scenario during operation of the vehicle.

23. The in-vehicle computing device of claim 17, wherein:
   the packet for transport supports remote teleoperation of the vehicle; and
   the scenario for multipath transmission is a scenario for remote teleoperation of the vehicle.

24. The in-vehicle computing device of claim 17, wherein the multipath transmission is a Multipath Real-Time Transport Protocol (MPRTP) transmission.

25. A non-transitory processor-readable storage medium having stored thereon processor-executable instructions configured to cause a processor of an in-vehicle computing device to perform operations comprising:
   receiving a packet for transport;
   determining delivery delays associated with a plurality of modems;
   assigning the packet to two or more of the plurality of modems based at least in part on the determined delivery delays, wherein:
      determining the delivery delays associated with the plurality of modems and assigning the packet to the two or more of the plurality of modems are performed in response to a determination that a scenario for multipath transmission is occurring; and
      determining the delivery delays associated with the plurality of modems comprises, for each modem of the plurality of modems, determining a respective modem's respective delivery delay based on a packet size of the packet, a queue size reported by the respective modem, a delivery rate estimate for the respective modem, and an end-to-end delivery delay estimate for the respective modem; and
   transmitting the packet from the assigned two or more of the plurality of modems along a multipath to a remote teleoperator computing device.

26. The non-transitory processor-readable storage medium of claim 25, wherein the stored processor-executable instructions are configured to cause the processor of the in-vehicle computing device to perform operations such that assigning the packet to the two or more of the plurality of modems based at least in part on the determined delivery delays comprises assigning the packet to the two or more of the plurality of modems based at least in part on the determined delivery delays and a path priority.

27. The non-transitory processor-readable storage medium of claim 25, wherein the stored processor-executable instructions are configured to cause the processor of the in-vehicle computing device to perform operations further comprising adjusting delivery rate estimates of one or more of the plurality of modems based on an end-to-end error detection mechanism.

28. The non-transitory processor-readable storage medium of claim 25, wherein the stored processor-executable instructions are configured to cause the processor of the in-vehicle computing device to perform operations further comprising:
   determining an adjusted media generation rate based at least in part on a respective available bandwidth for each of the plurality of modems; and
   controlling one or more encoders providing packets for transport according to the adjusted media generation rate.

29. The non-transitory processor-readable storage medium of claim 25, wherein the stored processor-executable instructions are configured to cause the processor of the in-vehicle computing device to perform operations such that the plurality of modems is three or more modems.

30. The non-transitory processor-readable storage medium of claim 25, wherein the stored processor-executable instructions are configured to cause the processor of the in-vehicle computing device to perform operations such that the scenario for multipath transmission is an ongoing scenario during operation of the vehicle.

31. The non-transitory processor-readable storage medium of claim 25, wherein the stored processor-executable instructions are configured to cause the processor of the in-vehicle computing device to perform operations such that:
   the packet for transport supports remote teleoperation of the vehicle; and
   the scenario for multipath transmission is a scenario for remote teleoperation of the vehicle.

32. The non-transitory processor-readable storage medium of claim 25, wherein the stored processor-executable instructions are configured to cause the processor of the in-vehicle computing device to perform operations such that the multipath transmission is a Multipath Real-Time Transport Protocol (MPRTP) transmission.

* * * * *